(12) United States Patent
Kolakaluri et al.

(10) Patent No.: US 12,390,770 B2
(45) Date of Patent: Aug. 19, 2025

(54) CONTACTOR SYSTEM AND METHOD OF OPERATING CONTACTOR SYSTEM

(71) Applicant: 3M INNOVATIVE PROPERTIES COMPANY, St. Paul, MN (US)

(72) Inventors: Ravi Kolakaluri, Roseville, MN (US); Vadim N. Savvateev, St. Paul, MN (US); Gareth P. Taylor, Indian Trail, NC (US); Shannon S. Le Blanc, White Bear Lake, MN (US); Dian Zheng, Woodbury, MN (US); Brinda B. Badri, Woodbury, MN (US); Paul A. Nielsen, LaGrange, GA (US); Amitava Sengupta, Charlotte, NC (US); Michael C. Flom, Apple Valley, MN (US); Timothy D. Price, Monroe, NC (US); Catherine A. Leatherdale, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 339 days.

(21) Appl. No.: 17/923,073

(22) PCT Filed: May 4, 2021

(86) PCT No.: PCT/IB2021/053748
§ 371 (c)(1),
(2) Date: Nov. 3, 2022

(87) PCT Pub. No.: WO2021/245477
PCT Pub. Date: Dec. 9, 2021

(65) Prior Publication Data
US 2023/0338899 A1   Oct. 26, 2023

Related U.S. Application Data

(60) Provisional application No. 63/033,313, filed on Jun. 2, 2020.

(51) Int. Cl.
*B01D 53/22* (2006.01)
*B01D 53/26* (2006.01)
(Continued)

(52) U.S. Cl.
CPC .......... *B01D 63/026* (2013.01); *B01D 53/22* (2013.01); *B01D 53/268* (2013.01);
(Continued)

(58) Field of Classification Search
CPC .. B01D 63/026; B01D 63/0822; B01D 53/22; B01D 53/268; B01D 2313/221;
(Continued)

(56) References Cited

U.S. PATENT DOCUMENTS

| 4,683,101 A | 7/1987 | Cates |
| 5,556,035 A | 9/1996 | Daub |

(Continued)

FOREIGN PATENT DOCUMENTS

| CN | 101435608 B | 4/2010 |
| CN | 201811367 U | 4/2011 |

(Continued)

OTHER PUBLICATIONS

Machine translate CN106907809A.*
(Continued)

*Primary Examiner* — Anthony R Shumate

(57) ABSTRACT

A contactor system includes a plurality of contactor panels. Each contactor panel includes a frame member and a membrane array adapted to be received within the frame member. The membrane array defines a first end portion, a second end portion, and a plurality of hollow fibers. The contactor system also includes a first manifold in selective fluid communication with the first end portion of the membrane array of each contactor panel. The contactor system further includes a second manifold in direct fluid communication
(Continued)

with the second end portion of the membrane array of each contactor panel. The contactor system includes a controller configured to provide selective fluid communication between the first manifold and the first end portion of the membrane array of each contactor panel.

10 Claims, 22 Drawing Sheets

(51) Int. Cl.
 *B01D 63/02* (2006.01)
 *B01D 63/08* (2006.01)
 *F24F 6/02* (2006.01)
(52) U.S. Cl.
 CPC ............ *B01D 63/0822* (2022.08); *F24F 6/02* (2013.01); *B01D 2257/80* (2013.01); *B01D 2313/18* (2013.01); *B01D 2313/221* (2022.08); *B01D 2313/243* (2013.01)
(58) Field of Classification Search
 CPC ............ B01D 2257/80; B01D 2313/18; B01D 2313/243; F24F 6/02
 See application file for complete search history.

(56) References Cited

U.S. PATENT DOCUMENTS

| | | | |
|---|---|---|---|
| 5,681,368 | A | 10/1997 | Rahimzadeh |
| 6,245,454 | B1 | 6/2001 | Gocho et al. |
| 6,502,807 | B1 | 1/2003 | Assaf et al. |
| 6,669,177 | B2 | 12/2003 | Shimanuki et al. |
| 7,866,637 | B2 | 1/2011 | Van Der Net |
| 8,317,167 | B2 | 11/2012 | Kim |
| 8,365,530 | B2 | 2/2013 | Zhang et al. |
| 9,541,302 | B2 | 1/2017 | Taylor et al. |
| 9,901,190 | B2 | 2/2018 | Resch |
| 10,021,814 | B2 | 7/2018 | Aoki et al. |
| 10,881,046 | B2 * | 1/2021 | Tribelhorn .......... A01M 7/0089 |
| 12,172,129 | B2 * | 12/2024 | Burba .................... B01D 61/04 |
| 2003/0209480 | A1 | 11/2003 | Kneifel et al. |
| 2009/0095162 | A1 | 4/2009 | Hargis et al. |
| 2012/0304862 | A1 | 12/2012 | Taylor et al. |
| 2013/0340449 | A1 | 12/2013 | Kozubal et al. |
| 2017/0251590 | A1 * | 9/2017 | Kolb ..................... B05B 13/005 |
| 2018/0135880 | A1 | 5/2018 | Ghadiri Moghaddam et al. |
| 2019/0212020 | A1 | 7/2019 | Besant et al. |
| 2019/0231600 | A1 * | 8/2019 | Locke ..................... A61F 13/05 |
| 2019/0264301 | A1 * | 8/2019 | Burba .................... B01D 15/10 |
| 2019/0338440 | A1 * | 11/2019 | Banik .................... C25D 21/14 |
| 2021/0382533 | A1 * | 12/2021 | Heydari ................. G06F 1/206 |
| 2022/0071049 | A1 * | 3/2022 | Heydari ................ H05K 7/2079 |
| 2022/0111138 | A1 * | 4/2022 | Robinson ............... A61F 13/05 |
| 2022/0212144 | A1 * | 7/2022 | Burba .................. B01J 20/0281 |
| 2023/0240052 | A1 * | 7/2023 | Heydari ............ H05K 7/20263 |
| 2023/0413477 | A1 * | 12/2023 | Heydari ................. G06N 3/063 |
| 2024/0312778 | A1 * | 9/2024 | Banik, II ................ H01L 24/81 |

FOREIGN PATENT DOCUMENTS

| | | |
|---|---|---|
| CN | 102175457 A | 9/2011 |
| CN | 205402992 U | 7/2016 |
| CN | 105841326 A | 8/2016 |
| CN | 205593083 U | 9/2016 |
| CN | 106765746 A | 5/2017 |
| CN | 106766997 A | 5/2017 |
| CN | 106907809 A | 6/2017 |
| CN | 206257764 U | 6/2017 |
| CN | 106979573 A | 7/2017 |
| CN | 107014012 A | 8/2017 |
| CN | 206531124 U | 9/2017 |
| CN | 107477720 A | 12/2017 |
| CN | 206695290 U | 12/2017 |
| CN | 105571020 B | 1/2018 |
| CN | 207019212 U | 2/2018 |
| CN | 108285185 A | 7/2018 |
| CN | 108328828 A | 7/2018 |
| CN | 108397838 A | 8/2018 |
| CN | 105674452 B | 9/2018 |
| CN | 207904067 U | 9/2018 |
| CN | 106196230 B | 12/2018 |
| CN | 109764736 A | 5/2019 |
| DE | 2910568 A1 | 9/1980 |
| DE | 102015005100 A1 | 3/2016 |
| EP | 0236634 B1 | 7/1991 |
| EP | 0650776 B1 | 6/1997 |
| EP | 1292799 A0 | 3/2003 |
| EP | 2113297 B1 | 4/2014 |
| EP | 2892320 B1 | 1/2019 |
| EP | 2887838 B1 | 10/2022 |
| IL | 125927 B | 7/2002 |
| JP | 63220026 A | 9/1988 |
| JP | 08277640 A | 10/1996 |
| JP | 10197016 A | 7/1998 |
| JP | 2000140560 A | 5/2000 |
| JP | 2001294402 A | 10/2001 |
| JP | 2002075421 A | 3/2002 |
| JP | 2009300029 A | 12/2009 |
| JP | 2012149819 A | 8/2012 |
| JP | 2015135230 A | 7/2015 |
| KR | 20120106314 A | 9/2012 |
| KR | 101344515 B1 | 12/2013 |
| KR | 101405689 B1 | 6/2014 |
| KR | 20200016444 A | 2/2020 |
| SG | 2012077962 A | 5/2014 |
| WO | 1998035399 A1 | 8/1998 |
| WO | 2000011426 A1 | 3/2000 |
| WO | 2003012357 A2 | 2/2003 |
| WO | 2013191489 A1 | 12/2013 |
| WO | 2014138851 A1 | 9/2014 |
| WO | 2015134060 A1 | 9/2015 |
| WO | 2018063849 A1 | 4/2018 |

OTHER PUBLICATIONS

JP2000140560A_machine translate.*
JPH10197016_machine translate.*
Charles, "The Occurrence and Characterization of Fouling During Membrane Evaporative Cooling", Journal of Membrane Science, Jul. 2008, vol. 319, No. 1-2, pp. 44-53.
Chen, "A Novel Evaporative Cooling System with a Polymer Hollow Fibre Spindle", Applied Thermal Engineering, Mar. 2018, vol. 132, pp. 665-675.
International Search Report for PCT Application No. PCT/IB2021/053748, mailed on Aug. 5, 2021, 3 pages.
Jang, "Energy Demand Comparison Between Hollow Fiber Membrane Based Dehumidification and Evaporative Cooling Dehumidification Using TRNSYS", Energies, 2018, vol. 11, pp. 1181/1-1181/15.
Johnson, "Analysis of Heat and Mass Transfer Phenomena in Hollow Fiber Membranes Used for Evaporative Cooling", Journal of Membrane Science, Dec. 2003, vol. 227, No. 1-2, pp. 159-171.
Jradi, "Testing and Performance Analysis of a Hollow Fiber-Based Core for Evaporative Cooling and Liquid Desiccant Dehumidification", International Journal of Green Energy, Apr. 2016, vol. 13, No. 13, pp. 1388-1399.
Laknizi, "Performance Analysis and Optimal Parameters of a Direct Evaporative Pad Cooling System Under the Climate Conditions of Morocco", Case Studies in Thermal Engineering, Mar. 2019, vol. 13, (100362) 11 Pages.
Kobayashi H., Development of compact and high-performance dehumidifying system for air conditioning system using liquid desiccant and moisture permeable membrane, Grants-in-Aid for Scientific Research Report of Research Achievements, May 16, 2017.

* cited by examiner

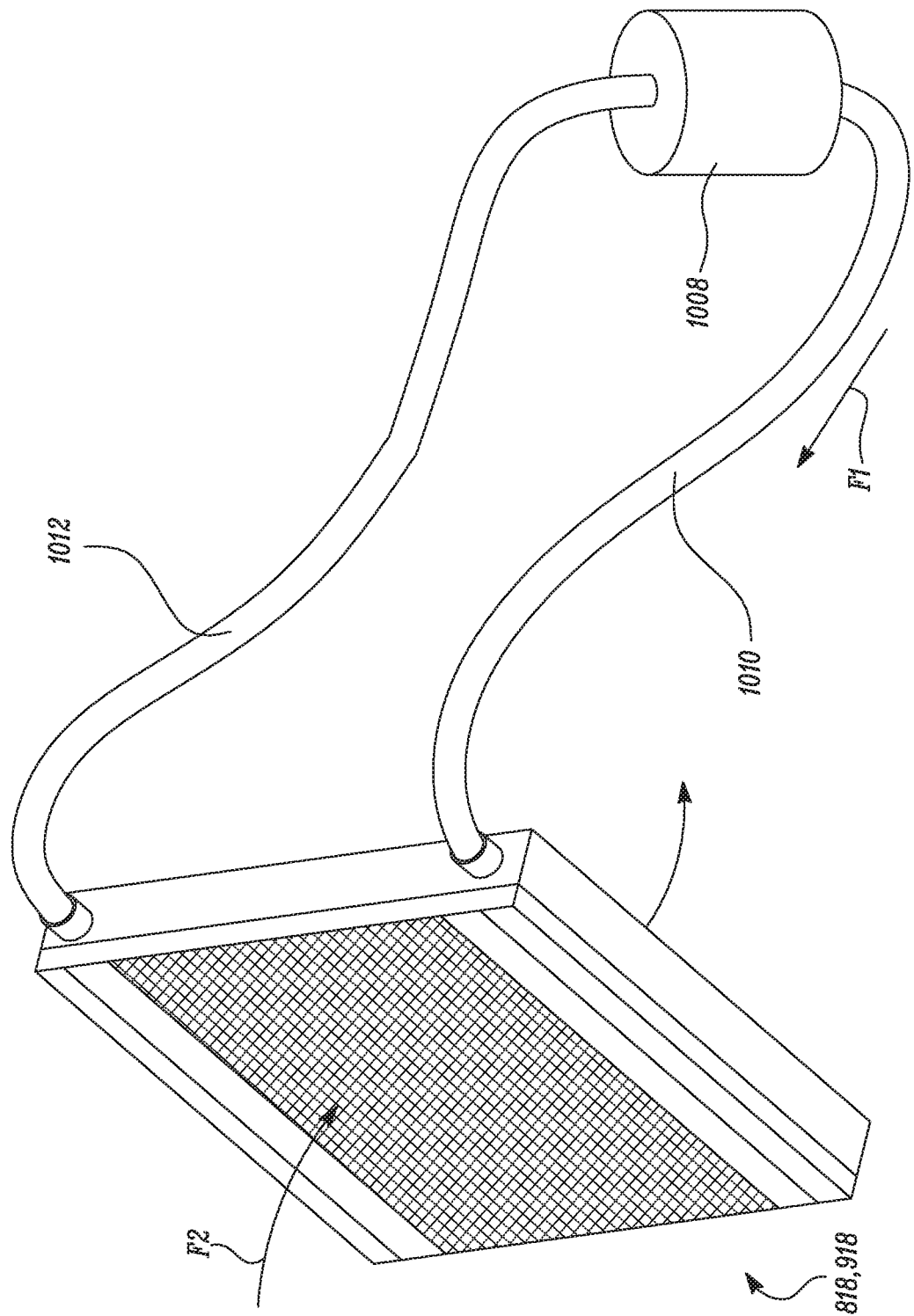

CONTACTOR SYSTEM AND METHOD OF OPERATING CONTACTOR SYSTEM

CROSS REFERENCE TO RELATED APPLICATIONS

This application is a national stage filing under 35 U.S.C. 371 of PCT/IB2021/053748, filed May 4, 2021, which claims the benefit of U.S. Provisional Application No. 63/033,313, filed Jun. 2, 2020, the disclosures of which are incorporated by reference in their entireties herein.

TECHNICAL FIELD

The present disclosure relates to a contactor system. More particularly, the present disclosure relates to the contactor system and a method of operating the contactor system.

BACKGROUND

A contactor is typically used to treat a fluid for varying a mass content and/or a heat content of the fluid. Accordingly, the contactor may be used in an evaporative cooling system, a heating system, a humidifying system, a dehumidifying system, and the like. The contactor may be used to bring two immiscible fluid phases (such as gas/gas, liquid/liquid, gas/liquid) in contact with each other to cause mass transfer and/or heat transfer from one fluid to another.

Such contactors typically include a contactor media installed in a frame member. Conventional contactors either include a wetted cellulosic media or a membrane array such as that explained in U.S. Pat. No. 9,541,302, hereinafter referred to as the '302 patent. The '302 patent describes use of a flat panel contactor having a plurality of hollow fibers that realize the function of separation and/or transfer from one fluid to another. Further, the wetted cellulosic media are generally fragile and are difficult to clean/maintain. Moreover, the wetted cellulosic medias are susceptible to fouling due to bacteria and/or also prone to scaling. Additionally, dissolved minerals in the fluid that flows through the wetted cellulosic media may cause degradation of the wetted cellulosic media if the wetted cellulosic media is not in a constant dry state or a constant wet state.

In large scale applications, usage of a single large contactor may not be feasible due to space constraints and/or servicing or replacement issues. Thus, a plurality of contactors may replace the single large contactor to realize requirements of large scale applications. Moreover, some applications may demand installation of the contactors in a compact space. Such applications may require the contactors to be arranged in a complex arrangement based on an availability of space in order to achieve a desired contactor efficiency. There may be instances where working with multiple contactors may involve longer time periods for mass and/or heat transfer, efficiency constraints, and other implementation challenges, particularly for applications involving a complex arrangement of the contactors. Thus, it is desirable to configure the contactors in a manner that may provide improved efficiency and involves a simpler arrangement of the contactors.

Moreover, in some applications, one or more characteristics, such as temperature or humidity, of the fluid being released by the contactors may need to be controlled based on application requirements. However, such a control strategy may not be effective for wetted cellulosic type contactor medias as it may be challenging to control variables, such as a working fluid flow rate, for controlling the temperature or the humidity. Moreover, in some applications, such wetted cellulosic type contactor medias may require large amounts of the working fluid, such as water, for operating purposes which may increase a usage of the working fluid.

Further, in large scale applications, such as in applications related to cooling of electronic components, thermal management control may be compromised due to presence of localized hot spots that are characterized by high temperature. Such hot spots may lead to non-uniform temperature/humidity within a room/area. Further, a lack of low temperature air at the hot spots may cause recirculation of warm air which may in turn increase the temperature at the hotspots. In such applications, a temperature of the fluid, such as air, being released by the contactors may need to be reduced to promote efficient and uniform cooling. Thus, there is a need for an economical and improved solution to control the contactors and also increase a coefficient of performance of such contactors.

BRIEF SUMMARY

Some embodiments of the present disclosure relates to a contactor system. The contactor system includes a plurality of contactor panels. Each contactor panel includes a frame member. Further, each contactor panel includes a membrane array adapted to be received within the frame member. The membrane array defines a first end portion and a second end portion. The membrane array includes a plurality of hollow fibers. The contactor system also includes a first manifold in selective fluid communication with the first end portion of the membrane array of each contactor panel, the first manifold being adapted to direct a first fluid towards the membrane array of each contactor panel. The contactor system further includes a second manifold in direct fluid communication with the second end portion of the membrane array of each contactor panel, the second manifold being adapted to receive the first fluid from the membrane array of each contactor panel. The contactor system includes a controller configured to provide selective fluid communication between the first manifold and the first end portion of the membrane array of each contactor panel.

Some embodiments of the present disclosure relates to a contactor system. The contactor system includes a plurality of contactor panels. Each contactor panel includes a frame member. Each contactor panel also includes a membrane array adapted to be received within the frame member. The membrane array defines a first end portion and a second end portion. The membrane array includes a plurality of hollow fibers. Each contactor panel further includes a valve assembly in fluid communication with the first end portion of the membrane array. The contactor system also includes a first manifold in selective fluid communication with the first end portion of the membrane array of each contactor panel, the first manifold being adapted to direct a first fluid towards the membrane array of each contactor panel based on an operation of the valve assembly. The contactor system further includes a second manifold in direct fluid communication with the second end portion of the membrane array of each contactor panel, the second manifold being adapted to receive the first fluid from the membrane array of each contactor panel. The contactor system includes a controller communicably coupled with the valve assembly of each contactor panel. The controller is configured to selectively control the valve assembly of at least one contactor panel for providing selective fluid communication between the first manifold and the first end portion of the membrane array of the least one contactor panel.

Some embodiments of the present disclosure relates to a method of operating a contactor system. The method includes introducing a first fluid within a first manifold of the contactor system. The contactor system further includes a second manifold, a plurality of contactor panels, and a controller, and wherein each contactor panel includes a membrane array and a valve assembly. The method also includes controlling, by the controller, the valve assembly associated with at least one contactor panel for providing selective fluid communication between the first manifold and the membrane array of the at least one contactor panel. The method further includes introducing the first fluid within the membrane array of the at least one contactor panel based on control of the valve assembly associated with the at least one contactor panel. The method includes controlling at least one characteristic of a second fluid flowing over the membrane array of the at least one contactor panel based on at least one of a mass transfer and a heat transfer between the first fluid flowing through the membrane array of the at least one contactor panel and the second fluid flowing over the membrane array of the at least one contactor panel

BRIEF DESCRIPTION OF THE SEVERAL VIEWS OF THE DRAWINGS

Like symbols in the drawings indicate like elements. To easily identify the discussion of any particular element or act, the most significant digit or digits in a reference number may refer to the figure number in which that element is first introduced.

FIGS. 10C and 10D illustrate the contactor panel installed in different orientations in accordance with some embodiments of the present disclosure herein

DETAILED DESCRIPTION

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

In the context of present disclosure, the terms "first" and "second" are used as identifiers. Therefore, such terms should not be construed as limiting of this disclosure. The terms "first" and "second" when used in conjunction with a feature or an element can be interchanged throughout the embodiments of this disclosure.

The present disclosure generally relates to contactor systems and method of operating such contactor systems. In various embodiments, the contactor system may include a combination of different contactor assemblies. Such contactor assemblies may include one or more contactor panels that are used for mass transfer and/or heat transfer in an air handling, ventilation, or duct system. The contactor panels include a membrane array having a number of hollow fibers. A first fluid flows through the hollow fibers while a second fluid contacts an outer surface of the hollow fibers. Further, the present disclosure describes contactor systems having a plurality of contactor panels that may be individually controlled to vary one or more characteristics, such as temperature and/or humidity, of the second fluid. A controller may be used to vary the characteristics of the second fluid based on presence of a potential hot spot in a room, such as a data center, a target temperature, a target humidity, and/or a temperature uniformity metric.

Moreover, such contactor systems may include one or more contactor panel arrays. Each contactor panel array includes an inlet manifold and an outlet manifold associated therewith. Further, the contactor system may be used for cooling electronic components, such as servers, installed in a room. Accordingly, one or more contactor panels may be installed in a floor, an aisle, or a wall of the room towards which treated air needs to be directed. Further, various embodiments of the contactor system described in this disclosure may be associated with an air duct, ventilation air duct, return (return air grille), vent, diffuser, filter housing, air handling equipment. The air handling equipment may include a Heating, Ventilation, and Air conditioning (HVAC) equipment, Heating, Ventilation, Air conditioning, and Refrigeration (HVACR or HVAC&R) equipment, Heating, Air conditioning, and Refrigeration (HACR) equipment, forced ventilation equipment, Energy Recovery Ventilation (ERV) equipment, Air conditioning (AC) equipment, refrigeration equipment, air handlers, and the like.

Figure 1:
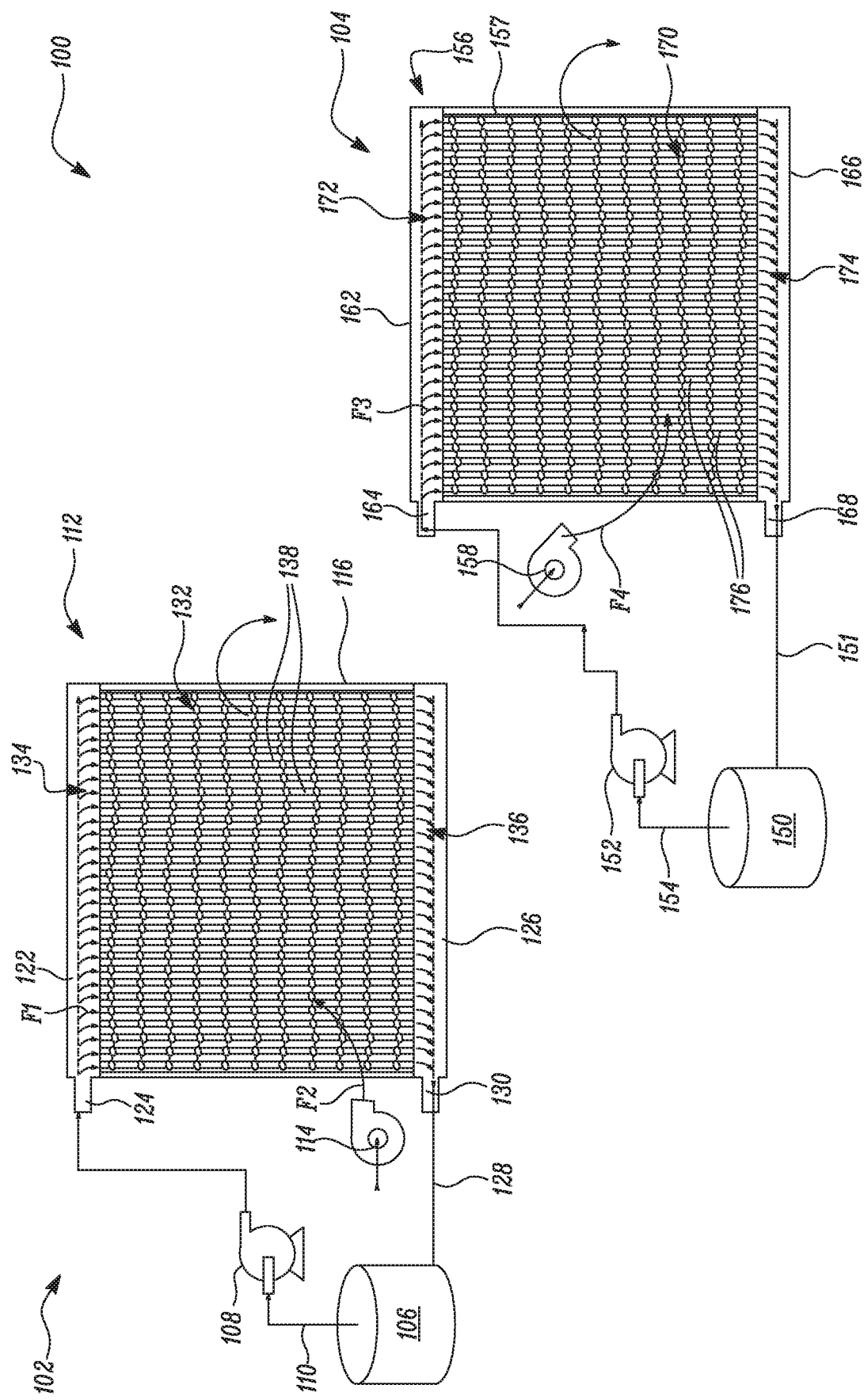
FIG. 1 illustrates a schematic view of a first contactor system in accordance with some embodiments discussed herein.

FIG. 1 illustrates a schematic view of a first contactor system 100, according to an embodiment of the present disclosure. The first contactor system 100 may include at least one of an evaporative cooling system, a dehumidification system, and a combination thereof. As illustrated herein, the first contactor system 100 is a combination of a dehumidification system 102 and an evaporative cooling system 104. In the illustrated embodiment, the dehumidification system 102 is embodied as a closed loop system having a first contactor panel 112. Further, an operation of the dehumidification system 102 is independent of an orientation of the first contactor panel 112 as a first fluid flowing through the first contactor panel 112 does not drip by gravity. More particularly, the dehumidification system 102 includes components that direct the first fluid towards the contactor panel 112 and may not require positioning of a reservoir/distributor at an elevation. The first contactor system 100 includes a first tank 106. The first tank 106 is embodied as a reservoir or vessel for holding the first fluid therein. In some examples, the first fluid may be precooled or preheated based on an application of the dehumidification system 102. Accordingly, the first tank 106 may be in fluid communication with a chilling module (similar to a chilling module 640 that will be explained later in this section) or a heating module (not shown) in order to precool or preheat the first fluid. In one example, the first fluid is at least one of a liquid and a gas. Further, the first fluid may include a liquid, a gas, a sweep gas, air, forced air, a vacuum, or combinations thereof. The liquid may include, for example, a cold and/or absorbent liquid, a salt solution, a hot and/or humidifying liquid, or a liquid desiccant. A type of the first fluid may vary based on an application of the first contactor system 100. In the illustrated example, the first fluid is the liquid desiccant. In another example, the first fluid may be hot and humid air.

The first contactor system 100 also includes a first pump 108. The first pump 108 is disposed in a first fluid conduit 110 that provides fluid communication between the first tank 106 and a first contactor panel 112. The first pump 108 pressurizes the first fluid to introduce the pressurized first fluid in the first contactor panel 112. In some examples, the first pump 108 may be designed to pressurize the first fluid to a pressure not higher than 5 pounds per square inch. The first pump 108 may further allow variation in a flow rate of the first fluid being directed towards the first contactor panel 112. The flow rate of the first fluid may vary based on a size of the contactor system 100 or an application thereof. In some examples, the flow rate may be approximately equal to 0.5 Gallon Per Minute (GPM) to 1 GPM. In other examples, the first fluid may flow at higher flow rates based on a type of application. In other embodiments, the dehumidification system 102 may be designed such that the first fluid drips through the first contactor panel 112 by gravity, without limiting the scope of the present disclosure.

Further, the first contactor system 100 includes a first blower unit 114 associated with the first contactor system 100. The first blower unit 114 directs a second fluid towards the first contactor panel 112. The first blower unit 114 may allow the second fluid to be pushed or pulled through the first contactor panel 112. In one example, the second fluid is at least one of a liquid and a gas. The second fluid may include a liquid, a gas, sweep gas, air, forced air, a vacuum, or combinations thereof. The liquid may include, for example, a cold and/or absorbent liquid, a salt solution, a hot and/or humidifying liquid, or a liquid desiccant. A type of the second fluid may vary based on an application of the first contactor system 100. Further, in the illustrated example, the second fluid is hot and humid air. In another example, the second fluid may be the liquid desiccant. In some examples, a filter 406 (shown in FIG. 4) is positioned upstream of the first contactor panel 112 to allow filtering of the second fluid before the second fluid contacts a membrane array 132 of the first contactor panel 112.

Figure 2A:
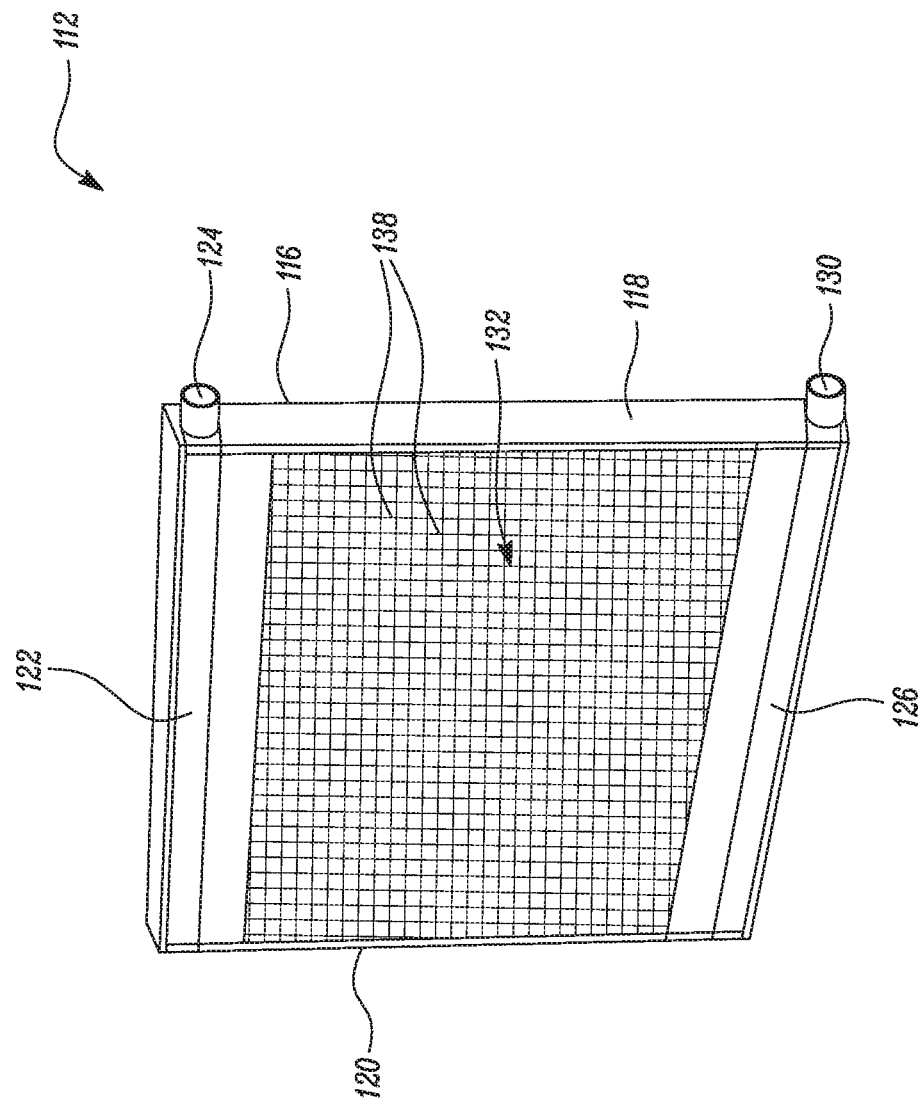
FIG. 2A illustrates a perspective view of an exemplary hollow fiber contactor panel associated with the first contactor system in accordance with some embodiments discussed herein.

Referring to FIG. 2A, the first contactor panel 112 includes a frame member 116. The frame member 116 may be square or rectangular in shape. The frame member 116 defines a first side panel 118 and a second side panel 120. The frame member 116 of the first contactor panel 112 defines a first headspace 122 in fluid communication with the first tank 106 (see FIG. 2) via the first fluid conduit 110 (see FIG. 1). The first headspace 122 defines a first port 124 that projects outwards from the first headspace 122. The first tank 106 is in fluid communication with the first headspace 122 via the first port 124. Further, the first headspace 122 is generally cuboid shaped. The frame member 116 also defines a second headspace 126 in fluid communication with the first tank 106 via a second fluid conduit 128 (shown in FIG. 1). The second headspace 126 defines a second port 130 that projects outwards from the second headspace 126. The first tank 106 is in fluid communication with the second headspace 126 via the second port 130. Further, the second headspace 126 is generally cuboid shaped. The first side panel 118, the second side panel 120, the first headspace 122, and the second headspace 126 may be joined, glued, or welded to each other.

The first contactor panel 112 includes the membrane array 132 adapted to be received within the frame member 116. The membrane array 132 defines a first end portion 134 (shown in FIG. 1) and a second end portion 136 (shown in FIG. 1). The membrane array 132 includes at least one of a plurality of hollow fibers 138, a flat sheet membrane, and a combination thereof. In some examples, each hollow fiber 138 includes a capillary membrane. In yet other examples, the membrane array 132 may include a ceramic membrane array.

In the illustrated example, the contactor panel 112 is embodied as a hollow fiber membrane contactor panel. Accordingly, the membrane array 132 includes the plurality of hollow fibers 138. The membrane array 132 extends between the first headspace 122 and the second headspace 126. In the illustrated example, the membrane array 132 is embodied as a dehumidification media. Further, the membrane array 132 is similar to the hollow fiber membrane array described in U.S. Pat. No. 9,541,302, hereinafter referred to as '302 patent. It should be noted that details corresponding to a design, material, and manufacturing of the membrane array 132 is similar to a design, material, and manufacturing of the hollow fiber membrane array described in the '302 patent.

Figure 2B:
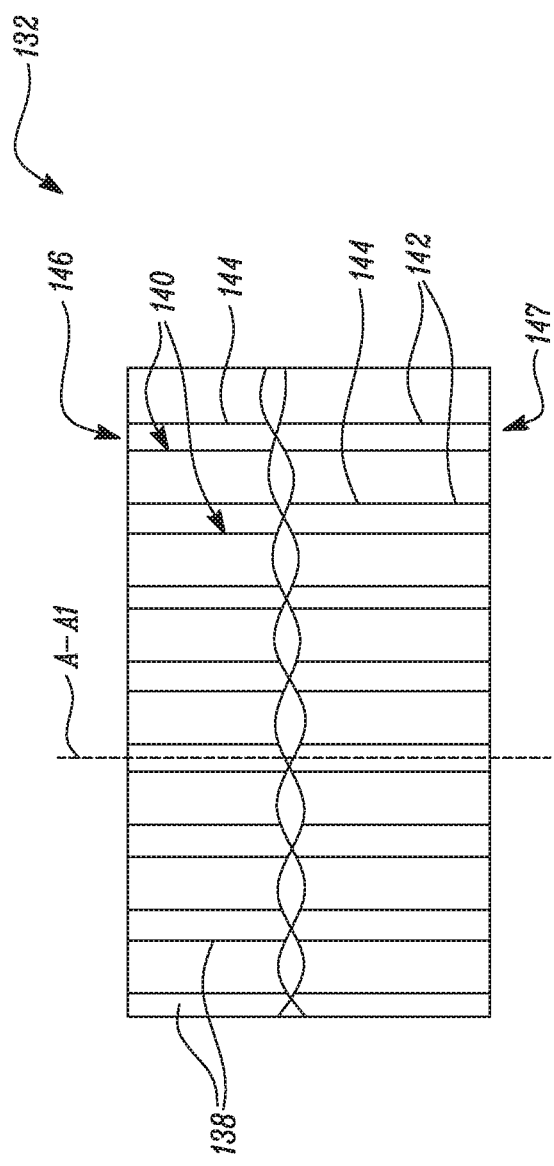
FIG. 2B illustrates a schematic view of a membrane array of the contactor panel of FIG. 1 in accordance with some embodiments discussed herein.

Referring to FIG. 2B, a portion of the membrane array 132 is illustrated. The membrane array 132 includes the plurality of hollow fibers 138 extending along a first fiber axis "A-A1". Further, each hollow fiber 138 includes a lumen 140 adapted to receive the first fluid. The lumen 140 may be hereinafter interchangeably referred to as a first portion 140. A flow of the first fluid through the first contactor system 100 is illustrated by a first fluid flow "F1" (shown in FIG. 1). Moreover, each hollow fiber 138 includes an exterior surface 142 adapted to contact the second fluid. The exterior surface 142 may be hereinafter interchangeably referred to as a second portion 142. A flow of the second fluid through the first contactor system 100 is illustrated by a second fluid flow "F2" (shown in FIG. 1). A wall 144 of each hollow fiber 138 separates the lumen 140 and the exterior surface 142. Each hollow fiber 138 defines a first end 146 and a second end 147 that are embodied as open ends.

Further, in order to couple the membrane array 132 with the first and second headspaces 122, 126 (see FIG. 2A), the first and second ends 146, 147 of each hollow fiber 138 are potted sealed around an outer diameter of the hollow fiber 138 using a potting material. The ends 146, 147 may be embedded in a resin by potting methods, such as gravity potting method, mold potting method, centrifugal potting method, and the like. The potting material may include epoxy, thermoplastics, polyurethane, etc. The potting material may seal each hollow fiber 138 to the first headspace 122 and the second headspace 126. It should be noted that the ends 146, 147 are potted sealed such that each lumen 140 is in fluid communication with the first headspace 122 and the second headspace 126, respectively.

Further, the membrane array 132 of the first contactor panel 112 (see FIG. 2A) is a microporous, hydrophobic, hollow fiber membrane array. Because of the hydrophobic nature of the membrane array 132, the membrane array 132 acts as an inert support to allow direct contact between a gas phase and a liquid phase, without dispersion. Further, a material of the membrane array 132 creates a barrier between the first fluid and the second fluid. The membrane array 132 may be manufactured using a dry stretch process. The membrane array 132 may be made of one or more of a polymer such as a polyolefin (PO), a polypropylene (PP), a polymethyl pentene (PMP, or poly(4-methyl-1-pentene)), and the like.

Further, pore sizes of the hollow fibers 138 of the membrane array 132 may be between 0.01 micron and 0.05 micron. In a specific example, the pore sizes of the hollow fibers 138 may be less than 0.04 micron. Thus, such as legionella, and/or dissolved minerals may be prevented from entering the second fluid, which may reduce a probability of surface fouling occurrence and scale buildup. Moreover, a turbulent flow nature of the second fluid through the hollow fibers 138 may also reduce the surface fouling occurrence. As the pores may block bacteria and/or other dissolved minerals from entering the second fluid, the contactor panel may be used for filtering liquids, de-bubbling liquids, and the like. Further, reduction in fouling occurrence and scale buildup in the membrane array 132 may reduce maintenance cost, a need for frequent cleaning of the first contactor panel 112, reduction in power consumption, and improvement in an efficiency of the first contactor panel 112. Moreover, the membrane array 132 associated with the first contactor panel 112 may be easily cleaned by an acid rinse through the hollow fibers 138. This technique may provide an easy and effective way of cleaning the membrane array 132. Additionally, the membrane array 132 may work reliably, may prolong product overhaul period, and may also allow reduction in a downtime and maintenance time associated with the first contactor system 100.

Figure 2C:
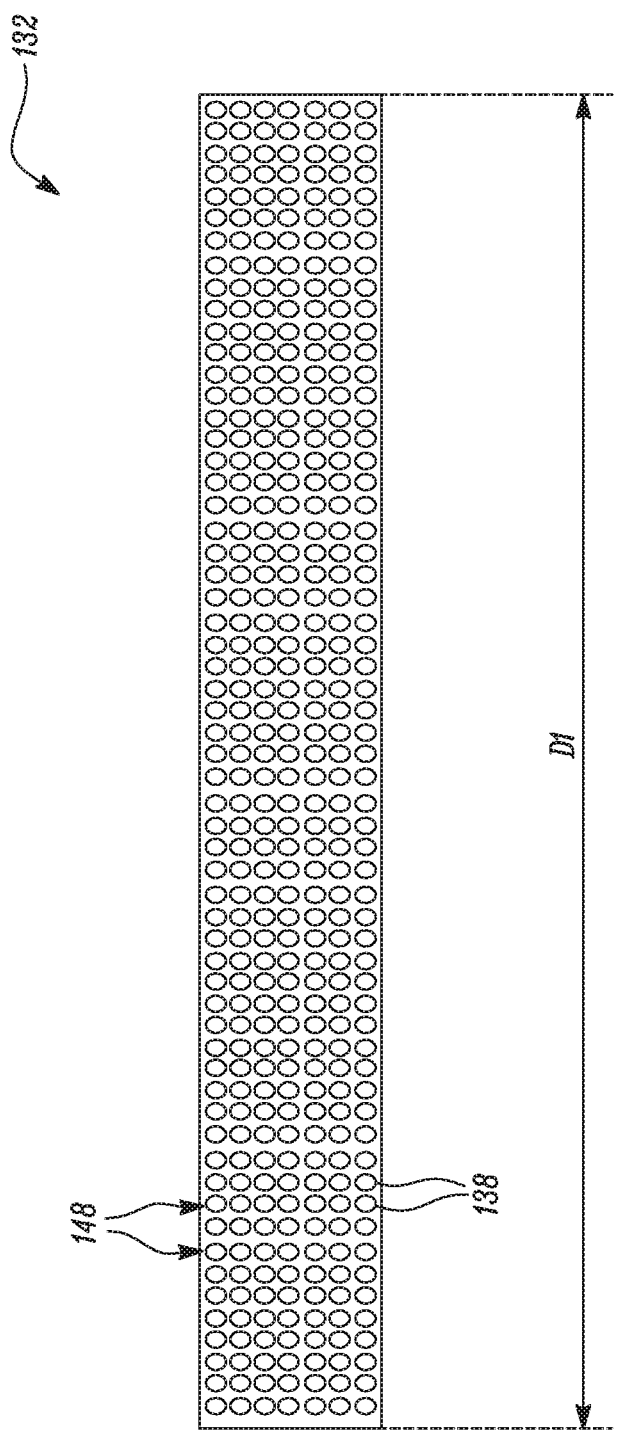
FIG. 2C illustrates a schematic view of the membrane array of the contactor panel of FIG. 1 in accordance with some embodiments discussed herein.

FIG. 2C illustrates a magnified view of the membrane array 132. It should be noted that an arrangement of the membrane array 132 illustrated herein is exemplary in nature. The membrane array 132 of the first contactor panel 112 (see FIG. 2A) includes at least one membrane layer 148. The at least one membrane layer 148 includes the plurality of hollow fibers 138. In the illustrated embodiment, the membrane array 132 includes a plurality of membrane layers 148 disposed adjacent to each other. The membrane layers 148 may be folded, pleated, or wound along a depth "D1" to form the membrane array 132. For example, the membrane layers 148 may be folded, pleated, wound, or bundled together such that the number of membrane layers 148 are disposed adjacent to each other. In the illustrated embodiment, the membrane array 132 includes sixty membrane layers 148, without any limitations. In another embodiment, the membrane array 132 may include twenty membrane layers or forty membrane layers, as per application requirements. Further, each membrane layer 148 includes eight hollow fibers 138. It may be contemplated that a total number of the membrane layers 148 and a total number of the hollow fibers 138 may vary, as per application requirements. The number of membrane layers 148 and the hollow fibers 138 may depend upon a desired efficiency of the first contactor panel 112. It should be noted that, in some examples, the efficiency of the first contactor panel 112 may be increased by increasing the membrane layers 148 and the hollow fibers 138.

Figure 3A:
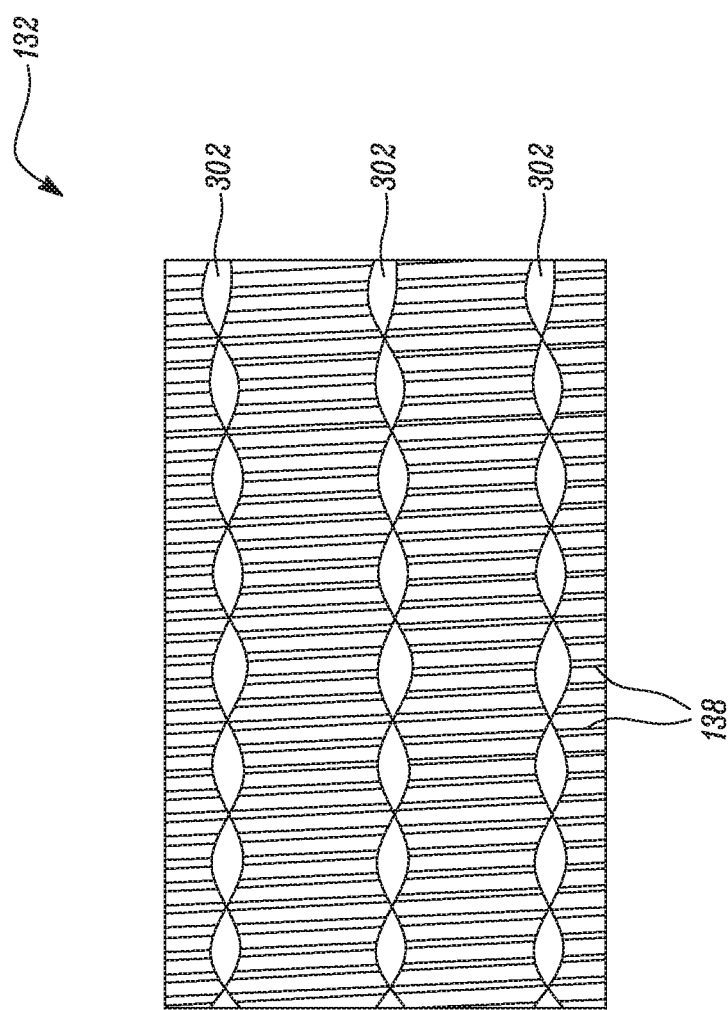
FIG. 3A illustrates a first technique of knitting a plurality of hollow fibers associated with the membrane array of FIG. 2B in accordance with some embodiments discussed herein.
Figure 3B:
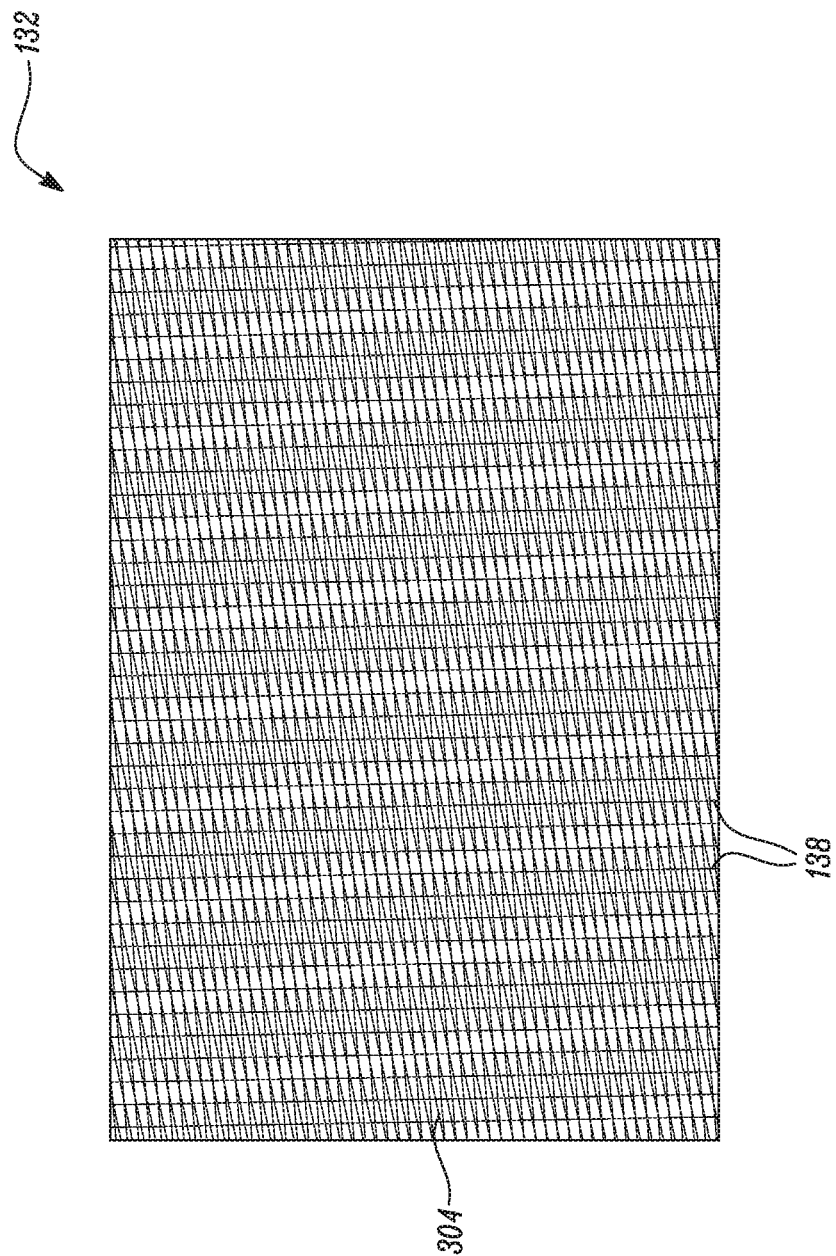
FIG. 3B illustrates a second technique of knitting the plurality of hollow fibers associated with the membrane array of FIG. 2B in accordance with some embodiments discussed herein.

Further, the plurality of hollow fibers 138 are knitted to form the membrane array 132. In one example, as illustrated in FIG. 3A, the hollow fibers 138 may be knitted using a number of straight threads 302 to form the membrane array 132. More particularly, a straight knit mat technology may be used to knit the hollow fibers 138. In another example, as illustrated in FIG. 3B, the hollow fibers 138 are knitted by cross threads 304 to form the membrane array 132. More particularly, a cross wound mat technology may be used to knit the membrane array 132. Further, in some examples, the membrane array 132 may be skewed together. The threads 302, 304 may be made of a material that is similar to a material of the hollow fibers 138. In one example, the threads 302, 304 may be made of PP. A material of the threads 302, 304 may be decided such that the threads 302, 304 are compatible with the second fluid.

Figure 4:
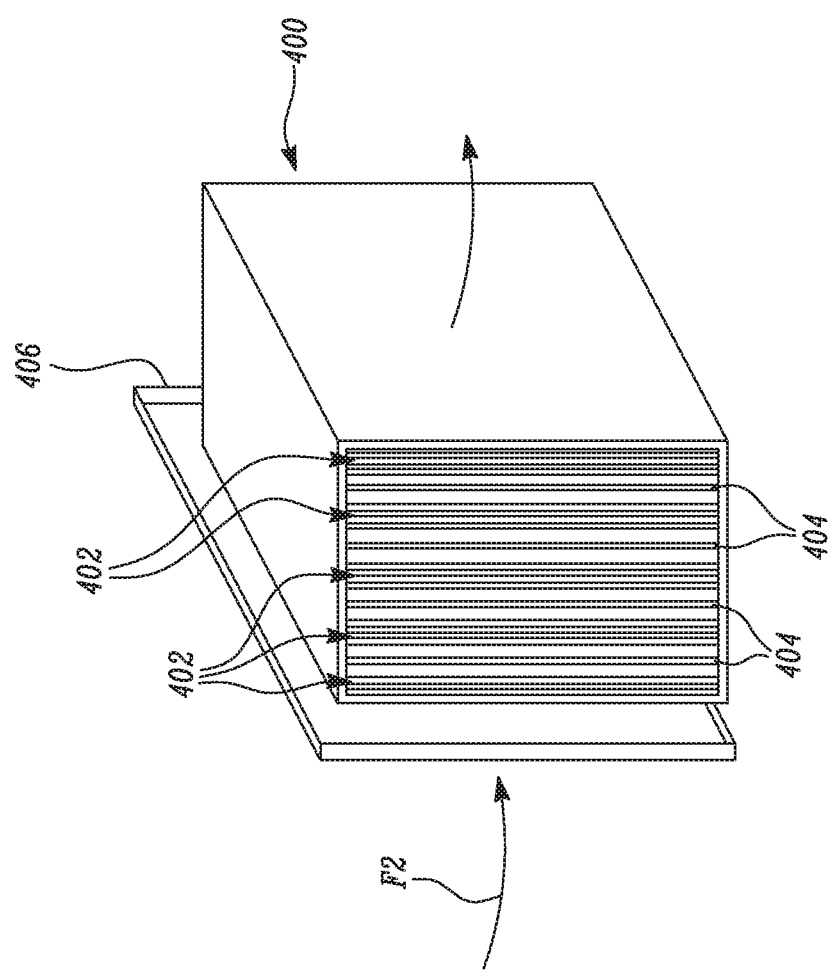
FIG. 4 is a schematic view illustrating a number of membrane arrays and a number of separator structures in accordance with some embodiments discussed herein.

FIG. 4 illustrates another embodiment of the present disclosure. The contactor panel 400 includes at least two membrane arrays 402 disposed adjacent to each other. In the illustrated example, the contactor panel 400 includes five membrane arrays 402 disposed adjacent to each other. However, it should be noted that a total number of the membrane arrays 402 may vary as per application requirements. Each membrane array 402 is similar to the membrane array 132 described in relation to FIGS. 2A to 2C. Further, the contactor panel 400 includes at least one separator structure 404 disposed adjacent to the membrane array 402. In the illustrated embodiment, the contactor panel 400 includes four separator structures 404, such that a separator structure 404 is disposed between adjacently disposed membrane arrays 402. Further, the separator structures 404 may have same thicknesses or each separator structure 404 may have varying thickness.

A shape and a dimension of the separator structures 404 corresponds to a shape and a dimension of the membrane arrays 402 so that the separator structures 404 can be received between the adjacent membrane arrays 402. In one example, the separator structure 404 is manufactured from a non-woven material. In some examples, the separator structure 404 may be manufactured from a metal or a plastic that is compatible with the second fluid flowing across the contactor panel 400. The separator structure 404 may include various designs. For example, the separator structure 404 may include a grille structure including a number of horizontally and/or vertically arranged bar members, a honeycomb structure, a sheet of metal or polymer having a number of through apertures, and the like, without any limitations.

The separator structure 404 may provide support to the membrane arrays 402 and may prevent the membrane arrays 402 from flexing, unfolding, unwinding, or spreading. The separator structure 404 decreases deflection of hollow fibers of the membrane arrays 402 and provides structural stability to the membrane arrays 402 against pressure being applied by the second fluid. Moreover, incorporation of the separator structure 404 may increase an overall thickness of the contactor panel 400. The increase in the thickness of the contactor panel 400 may increase an exposure time of the second fluid flowing across the contactor panel 400 and may cause reduction in pressure drop across the contactor panel 400. Such a phenomenon may in turn improve effectiveness of the contactor panel 400. Further, the filter 406 is disposed proximate to the contactor panel 400, and more particularly, at an inlet side of the contactor panel 400 so that the flow "F2" of the second fluid may be filtered before the second fluid contacts the membrane arrays 402.

Although the present disclosure is being described in relation to the contactor panel 112 (see FIG. 1) having the hollow fibers 138 (see FIG. 2B), the teachings of the present disclosure can be implemented to other types of contactor panels including, but not limited to, flat sheet membrane contactor panels, capillary membrane contactor panels, and/or ceramic membrane contactor panels, without any limitations. Such flat sheet membrane contactor panels or capillary membrane contactor panels may be used when the contactor system 100 (see FIG. 1) is embodied as an air desiccation system.

Figure 5:
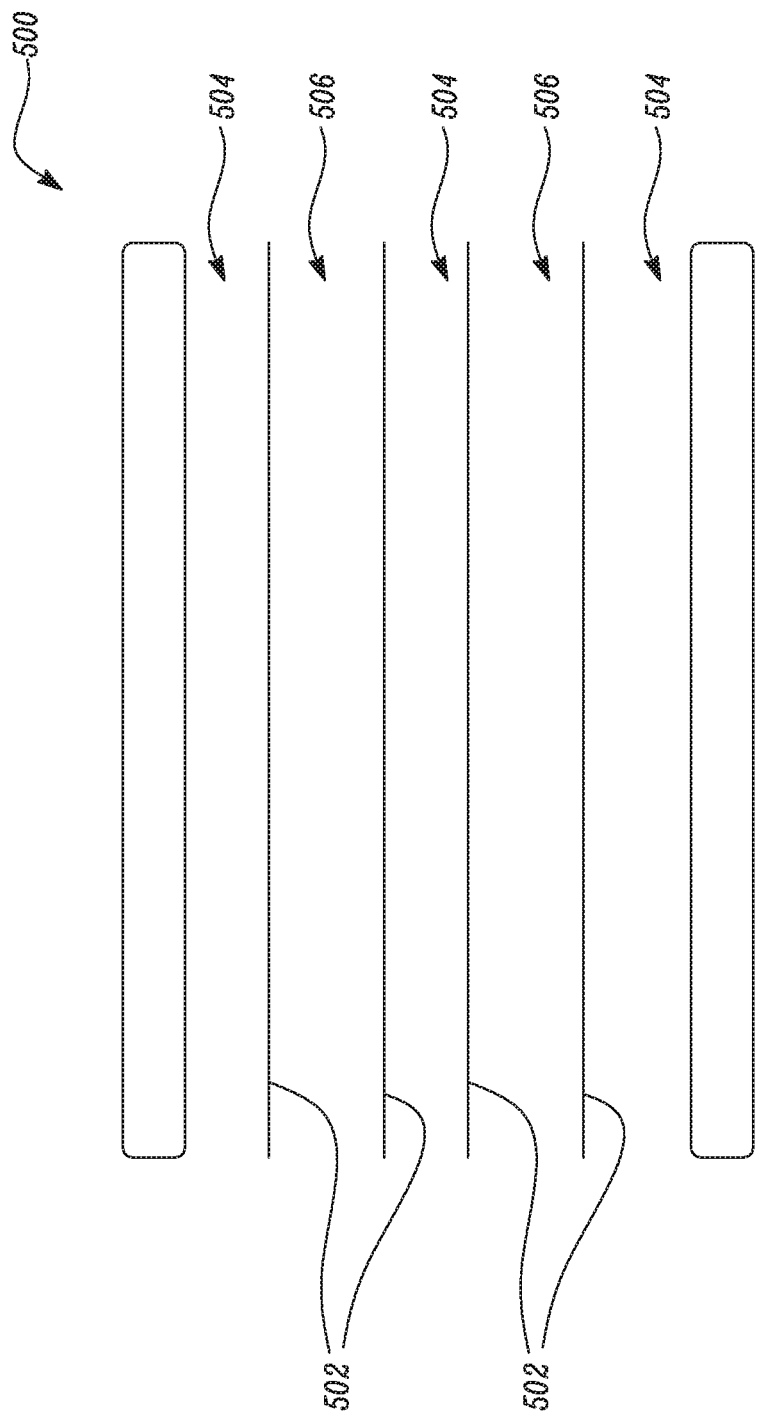
FIG. 5 illustrates an exemplary flat sheet membrane contactor panel in accordance with some embodiments discussed herein.

Referring to FIG. 5, an exemplary flat sheet membrane contactor panel 500 is illustrated. The schematically illustrated flat sheet membrane contactor panel 500 may provide heat and/or mass transfer between the first fluid and the second fluid. The flat sheet membrane contactor panel 500 may include a number of flat sheet membrane arrays 502 disposed adjacent to each other, such that channels 504, 506 exist therebetween. The channels 504 may receive the second fluid whereas the channels 506 may receive the first fluid. In other examples, the contactor panel 500 may be embodied as a spiral wound contactor panel, without any limitations. Further, the flat sheet membrane arrays 502 may be made of one or more of a polymer such as PO, PP, PMP, and the like. In some alternative embodiments, the flat sheet membrane contactor panel 500 may include, but not limited to, parallel-plate membrane contactor panels. In some of these alternative embodiments, the contactor panel 500 may include, but not limited to, cross-flow parallel-plate membrane contactor panels, counter-flow parallel-plate membrane contactor panels, quasi-counter-flow flow parallel-plate membrane contactor panels, or any combination thereof.

Referring now to FIG. 1, during an operation of the dehumidification system 102, the first headspace 122 receives the first fluid from the first tank 106 via the first fluid conduit 110 and the first port 124. The first headspace 122 directs the first fluid, such as the liquid desiccant, through the lumen 140 (see FIG. 2B) of each hollow fiber 138. The first fluid flows through the lumen 140 of each hollow fiber 138 and is introduced in the second headspace 126. The second headspace 126 in turn directs the first fluid towards the first tank 106 via the second port 130 and the second fluid conduit 128. Further, the first blower unit 114 directs the second fluid, such as air, towards the exterior surface 142 (see FIG. 2B) of each hollow fiber 138. Based on the flow of the second fluid over the membrane array 132, a humidity of the second fluid decreases based on mass transfer between the first fluid and the second fluid. The second fluid that is released may be hot and dry air. Further, only mass transfer occurs when the first contactor panel 112 is used in the dehumidification system 102. Moreover, the mass transfer between the liquid and gas phases is governed entirely by a pressure of the gas phase.

It should be noted that the first fluid may not pass through the pores of the hollow fibers 138. Due to the micro pore size of the hollow fibers 138, the first fluid permeating towards the exterior surface 142 of the hollow fibers 138 is converted to water mist, which may further improve an evaporation rate. The wall 144 (see FIG. 2B) of each hollow fiber 138 may act as an inert medium that may bring the first fluid and the second fluid into direct contact, without dispersion. It should be noted that the first contactor panel 112 described herein may provide a high contact surface area to volume ratio which may in turn translate to a compact footprint and system size and may also improve an efficiency of the contactor system.

Further, the first contactor system 100 includes the evaporative cooling system 104. The first contactor system 100 includes a second tank 150. The second tank 150 is embodied as a reservoir or vessel for holding a third fluid therein. In one example, the third fluid is at least one of a liquid and a gas. Further, the third fluid may include a liquid, a gas, a sweep gas, air, forced air, a vacuum, or combinations thereof. The liquid may include, for example, a cold and/or absorbent liquid, a salt solution, a hot and/or humidifying liquid, or a liquid desiccant. A type of the third fluid may vary based on an application of the first contactor system 100. In the illustrated example, the third fluid is water. In another examples, the third fluid may be hot and dry air.

The first contactor system 100 also includes a second pump 152. The second pump 152 is disposed in a third fluid conduit 154 that provides fluid communication between the second tank 150 and a second contactor panel 156. The second pump 152 pressurizes the third fluid to introduce the pressurized third fluid in the second contactor panel 156. Further, the first contactor system 100 includes a second blower unit 158. The second blower unit 158 directs a fourth fluid towards the second contactor panel 156. In one example, the fourth fluid is at least one of a liquid and a gas. The fourth fluid may include a liquid, a gas, sweep gas, air, forced air, a vacuum, or combinations thereof. The liquid may include, for example, a cold and/or absorbent liquid, a salt solution, a hot and/or humidifying liquid, or a liquid desiccant. A type of the fourth fluid may vary based on an application of the first contactor system 100. Further, in the illustrated example, the fourth fluid is a portion of the dry and hot air that is released by the dehumidification system 102. In another example, the fourth fluid may be water.

The second contactor panel 156 includes a frame member 157. The frame member 157 may be square or rectangular in shape. The frame member 157 defines a first side panel (not shown) and a second side panel (not shown). The frame member 157 of the second contactor panel 156 defines a first headspace 162 in fluid communication with the second tank 150 via the third fluid conduit 154. The first headspace 162 defines a first port 164 that projects outwards from the first headspace 162. The second tank 150 is in fluid communication with the first headspace 162 via the first port 164.

Further, the first headspace 162 is generally cuboid shaped. The frame member 157 also defines a second headspace 166 in fluid communication with the second tank 150 via a fourth fluid conduit 151. The second headspace 166 defines a second port 168 that projects outwards from the second headspace 166. The second tank 150 is in fluid communication with the second headspace 166 via the second port 168. The second headspace 166 is generally cuboid shaped. The first side panel, the second side panel, the first headspace 162, and the second headspace 166 may be joined, glued, or welded to each other.

The second contactor panel 156 includes a membrane array 170 adapted to be received within the frame member 157. The membrane array 170 defines a first end portion 172 and a second end portion 174. The membrane array 170 includes a plurality of hollow fibers 176. The membrane array 170 extends between the first headspace 162 and the second headspace 166. In the illustrated example, the membrane array 170 is embodied as an evaporative cooling media. The membrane array 170 is similar in construction, design, and material to the membrane array 132 explained in relation to the first contactor panel 112. Further, each hollow fiber 176 includes a lumen (not shown) adapted to receive the third fluid. Moreover, each hollow fiber 176 includes an exterior surface (not shown) adapted to contact the fourth fluid. A wall (not shown) of each hollow fiber 176 separates the lumen and the exterior surface. Each hollow fiber 176 defines a first end (not shown) and a second end (not shown) that are embodied as open ends.

During an operation of the evaporative cooling system 104, the first headspace 162 receives the third fluid from the second tank 150. The first headspace 162 directs the third fluid, such as water, through the lumen of each hollow fiber 176. A flow of the third fluid through the first contactor system 100 is illustrated by a third fluid flow "F3". The third fluid flows through the lumen of each hollow fiber 176 and is introduced in the second headspace 166. The second headspace 166 in turn directs the third fluid towards the second tank 150. Further, the second blower unit 158 directs the fourth fluid, such as dry and hot air, towards the exterior surface of each hollow fiber 176. A flow of the fourth fluid through the first contactor system 100 is illustrated by a fourth fluid flow "F4". Based on the flow of the fourth fluid over the membrane array 170, a temperature and a humidity of the fourth fluid decreases based on heat and mass transfer between the third fluid and the fourth fluid. Further, the fourth fluid that is released may be cool and humid air. Moreover, both heat transfer and mass transfer occur when the second contactor panel 156 is used in the evaporative cooling system 104. It should be noted that the mass transfer between the liquid and gas phases is governed by a pressure of the gas phase. It should be noted that the third fluid may not pass through the pores of the hollow fibers 176. Only water vapor may pass from the lumen towards the exterior surface through evaporation. The wall of each hollow fiber 176 may act as an inert medium that may bring the third fluid and the fourth fluid into direct contact, without dispersion. Further, as only water vapor passes across the membrane, requirement of a mist capturing screen in a duct may be eliminated.

Figure 6A:
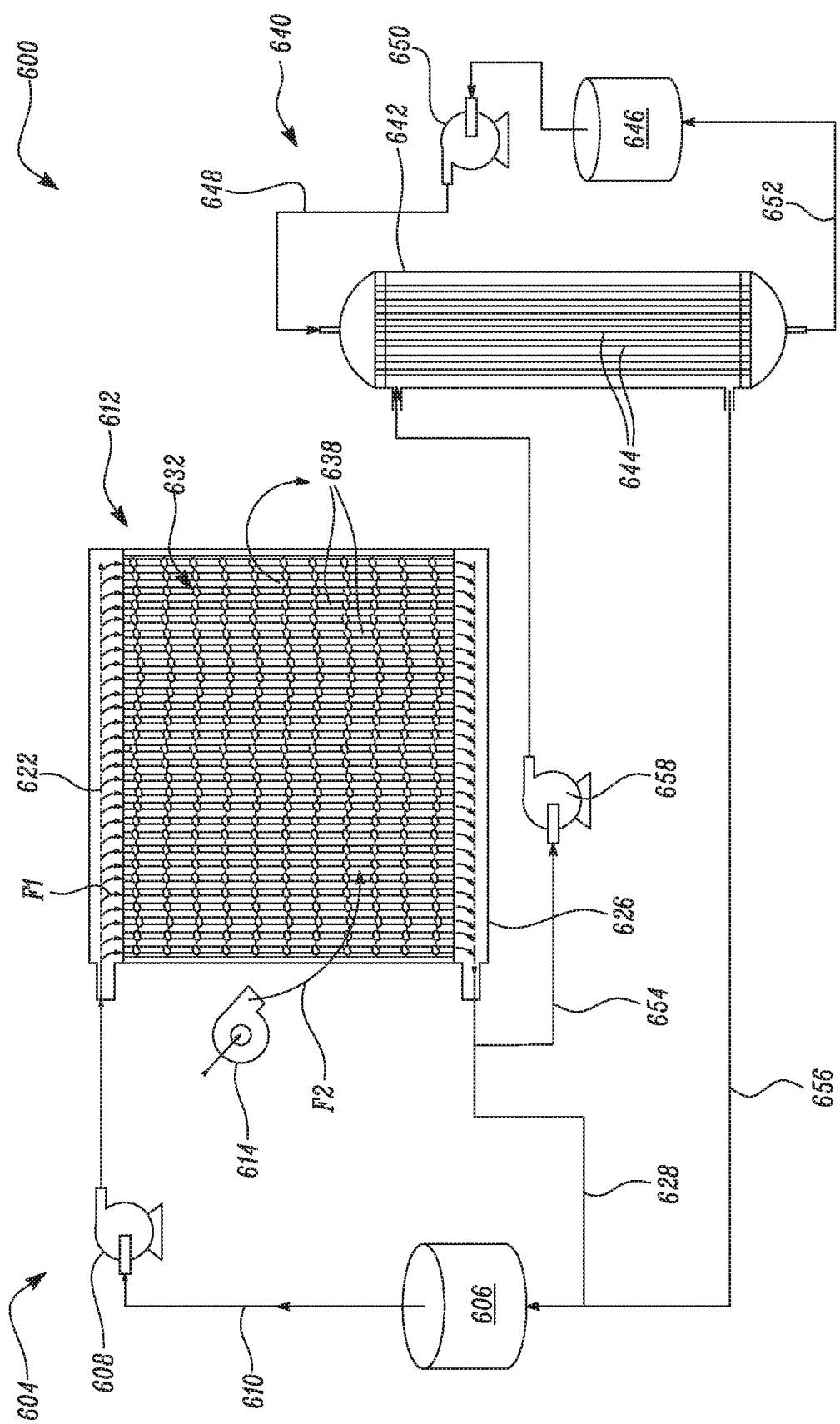
FIG. 6A illustrates a schematic view of a second contactor system including a chilling module in accordance with some embodiments discussed herein.

FIG. 6A illustrates a second contactor system 600, according to an embodiment of the present disclosure. The second contactor system 600 includes an evaporative cooling system 604. The evaporative cooling system 604 is similar in design to the dehumidification system 102 associated with the first contactor system 100 explained in relation to FIG. 1. Accordingly, the second contactor system 600 includes a tank 606, a pump 608, a blower unit 614, a first fluid conduit 610, a second fluid conduit 628, and a contactor panel 612 that is similar to the first tank 106, the first pump 108, the first blower unit 114, the first fluid conduit 110, the second fluid conduit 128, and the first contactor panel 112. The pump 608 pressurizes the first fluid to introduce the pressurized first fluid in the contactor panel 612. In the illustrated example, the first fluid is water. In another example, the first fluid may be dry and hot air. Further, the blower unit 614 directs a second fluid towards the contactor panel 612. In the illustrated example, the second fluid is dry and hot air. In another example, the second fluid may be water.

The contactor panel 612 includes a first headspace 622, a second headspace 626, a membrane array 632, and a plurality of hollow fibers 638 similar to the first headspace 122, the second headspace 126, the membrane array 132, and the plurality of hollow fibers 138. During an operation of the evaporative cooling system 604, the first headspace 622 receives the first fluid from the tank 606. The first headspace 622 directs the first fluid, such as water, through a lumen (not shown) of each hollow fiber 638. A flow of the first fluid through the second contactor system 600 is illustrated by a first fluid flow "F1". The first fluid flows through the lumen of each hollow fiber 638 and is introduced in the second headspace 626. Further, the blower unit 614 directs the second fluid, such as dry and hot air, towards an exterior surface (not shown) of each hollow fiber 638. A flow of the second fluid through the second contactor system 600 is illustrated by a second fluid flow "F2". Based on the flow of the second fluid over the membrane array 632, a temperature and a humidity of the second fluid decreases based on heat transfer and mass transfer between the first fluid and the second fluid. Thus, both heat transfer and mass transfer occur when the contactor panel 612 is used in the evaporative cooling system 604.

Moreover, the second headspace 626 directs the first fluid towards the tank 606 via the second fluid conduit 628. Further, the second contactor system 600 includes the chilling module 640 fluidly coupled with the tank 606. The chilling module 640 is adapted to decrease a temperature of the first fluid. The chilling module 640 may increase a cooling efficiency of the second contactor system 600. The chilling module 640 includes a coolant reservoir 646. The coolant reservoir 646 holds a coolant, such as chilled water, therein. The chilling module 640 also includes a heat exchanger 642 in fluid communication with the coolant reservoir 646 and the tank 606. The heat exchanger 642 includes a number of tubes 644. The heat exchanger 642 is in fluid communication with the coolant reservoir 646 via a first fluid pipe 648. The coolant received from the coolant reservoir 646 flows through the tubes 644.

Further, a coolant pump 650 is fluidly disposed between the tank 606 and the heat exchanger 642. The coolant pump 650 is disposed in the first fluid pipe 648. The coolant pump 650 is adapted to pressurize the coolant being directed towards the heat exchanger 642. Further, the fluid exiting the heat exchanger 642 is directed towards the coolant reservoir 646 via a second fluid pipe 652. The heat exchanger 642 also includes a third fluid pipe 654 that is in fluid communication with the second fluid conduit 628. The third fluid pipe 654 receives the first fluid exiting the contactor panel 612. A second pump 658 is disposed in the third fluid pipe 654 to pressurize and deliver the first fluid towards the heat exchanger 642. Further, the first fluid received within the heat exchanger 642 is adapted to flow over the tubes 644. As the first fluid flows over the tubes 644, the temperature of the first fluid decreases due to heat exchange between the coolant and the first fluid. Further, a fourth fluid pipe 656 provides fluid communication between the heat exchanger 642 and the tank 606. The fourth fluid pipe 656 directs the first fluid that is at a lower temperature towards the tank 606 from where the first fluid may be directed towards the contactor panel 612.

Further, incorporation of the chilling module 640 provides an additional heat exchange mechanism to lower the temperature of the first fluid, such as water, being directed towards the contactor panel 612. Such a technique may allow the contactor system 600 to achieve improved saturation effectiveness over conventional contactor systems.

temperature increases and both latent heat transfer and sensible heat transfer occurs between water and air. It was further found that in the second experiment the saturation effectiveness may be more than 100% due to combination of latent heat transfer and sensible heat transfer between water and air.

Table 2 provided below illustrates findings based on a third experiment and a fourth experiment performed on a contactor panel similar to the contactor panel 112/612. The contactor panel included a 40 layered membrane array. All temperatures were measured in Fahrenheit (° F.).

TABLE 2

| Serial Number | Inlet Air Temperature (° F.) | Outlet Air Temperature (° F.) | Inlet Water Temperature (° F.) | Outlet Water Temperature (° F.) | Room Temperature (° F.) | Saturation Effectiveness |
|---|---|---|---|---|---|---|
| Third Experiment | 72 | 63 | 67.8 | 62.7 | 72.5 | 50 |
| Fourth Experiment | 97.3 | 70.2 | 67.8 | 81.2 | 71.8 | 143.5 |

More particularly, at elevated temperature and humidity levels, the contactor panel 612 may allow latent heat transfer thereby allowing water evaporation and cooling of the second fluid. Further, once a relative humidity at each pore site approaches 100%, water evaporation slows down. In such instances, lowering the temperature of the first fluid using the chilling module 640 may also allow sensible heat transfer as the temperature of the first fluid is lower than that of the second fluid. This additional heat exchange mechanism may further allow cooling of the second fluid and warming of the first fluid.

Table 1 provided below illustrates findings based on a first experiment and a second experiment performed on a contactor panel similar to the contactor panel 112 (shown in FIG. 1) or the contactor panel 612. The contactor panel included a 20 layered membrane array. All temperatures were measured in Fahrenheit (° F.).

As illustrated in Table 2, in the third experiment, inlet air temperature was approximately equal to room temperature. Further, in the third experiment, a low temperature difference existed between the inlet air temperature and inlet water temperature. From the third experiment it was concluded that due to the low difference between the inlet air temperature and the inlet water temperature, outlet water temperature decreases and only latent heat transfer occurs between water and air. Further, in the fourth experiment, the inlet air temperature was approximately equal to 97° F. In in the fourth experiment, a high temperature difference existed between the inlet air temperature and the inlet water temperature. From the fourth experiment it was concluded that due to the high difference between the inlet air temperature and the inlet water temperature, the outlet water temperature increases and both latent heat transfer and sensible heat transfer occurs between water and air. It was further found

TABLE 1

| Serial Number | Inlet Air Temperature (° F.) | Outlet Air Temperature (° F.) | Inlet Water Temperature (° F.) | Outlet Water Temperature (° F.) | Room Temperature (° F.) | Saturation Effectiveness |
|---|---|---|---|---|---|---|
| First Experiment | 72 | 64.6 | 67.8 | 65.2 | 72.5 | 40.8 |
| Second Experiment | 101.3 | 77.4 | 73.2 | 86.6 | 74.0 | 127.3 |

As illustrated in Table 1, in the first experiment, inlet air temperature was approximately equal to room temperature. Further, in the first experiment, a low temperature difference existed between the inlet air temperature and inlet water temperature. From the first experiment it was concluded that due to the low temperature difference between the inlet air temperature and the inlet water temperature, outlet water temperature decreases and only latent heat transfer occurs between water and air. Further, in the second experiment, the inlet air temperature was approximately equal to 101° F. In the second experiment, a high temperature difference existed between the inlet air temperature and the inlet water temperature. From the second experiment it was concluded that due to the high temperature difference between the inlet air temperature and the inlet water temperature, the outlet water that in the fourth experiment the saturation effectiveness may be more than 100% due to combination of latent heat transfer and sensible heat transfer between water and air.

Figure 6B:
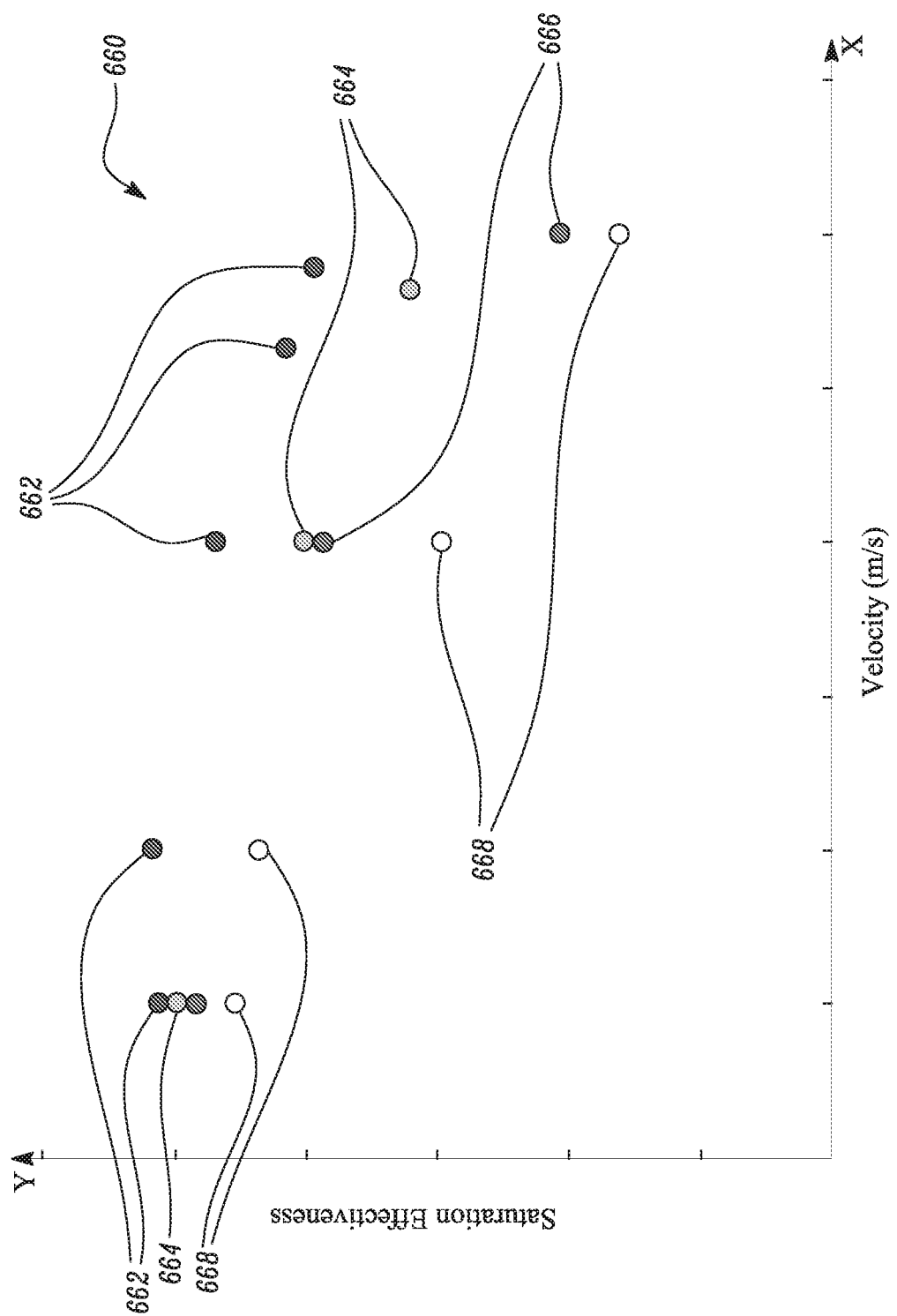
FIG. 6B illustrates an exemplary plot in accordance with some embodiments discussed herein.

FIG. 6B illustrates an exemplary plot 660. Various values for velocity (in meters per second) of inlet air are marked on X-axis and various values for saturation effectiveness are marked on Y-axis. Further, the plot 660 illustrates a number of points 662, 664, 666, 668 that represent data based on a series of experiments performed on contactor panels, similar to the contactor panel 112, associated with the contactor system 100 of FIG. 1, or the contactor panel 612, associated with the contactor system 600 of FIG. 6A. More particularly, the number of first points 662 were plotted based on a series of experiments performed on a contactor panel with a 40 layered membrane array at a water flow rate of approximately 1 GPM. Moreover, the number of second points 664 were plotted based on a series of experiments performed on a contactor panel with a 40 layered membrane array at a water flow rate of approximately 0.5 GPM. Further, the number of third points 666 were plotted based on a series of experiments performed on a contactor panel with a 20 layered membrane array at a water flow rate of approximately 1 GPM. Additionally, the number of fourth points 668 were plotted based on a series of experiments performed on a contactor panel with a 20 layered membrane array at a water flow rate of approximately 0.5 GPM.

It should be noted that a temperature of the inlet air being directed towards the contactor panels for each experiment was approximately equal to 100° F. From the plot 660, it can be concluded that the contactor panels may demonstrate higher saturation effectiveness if a difference between the temperature of the inlet air and a temperature of inlet water is greater. The reason for the high saturation effectiveness may be attributed to a combination of latent heat transfer and sensible heat transfer from water to the air due to higher temperature difference between the temperature of the inlet air and the temperature of the inlet water. It was further found that the saturation effectiveness may be more than 100% due to combination of latent heat transfer and sensible heat transfer from water to air.

Figure 7:
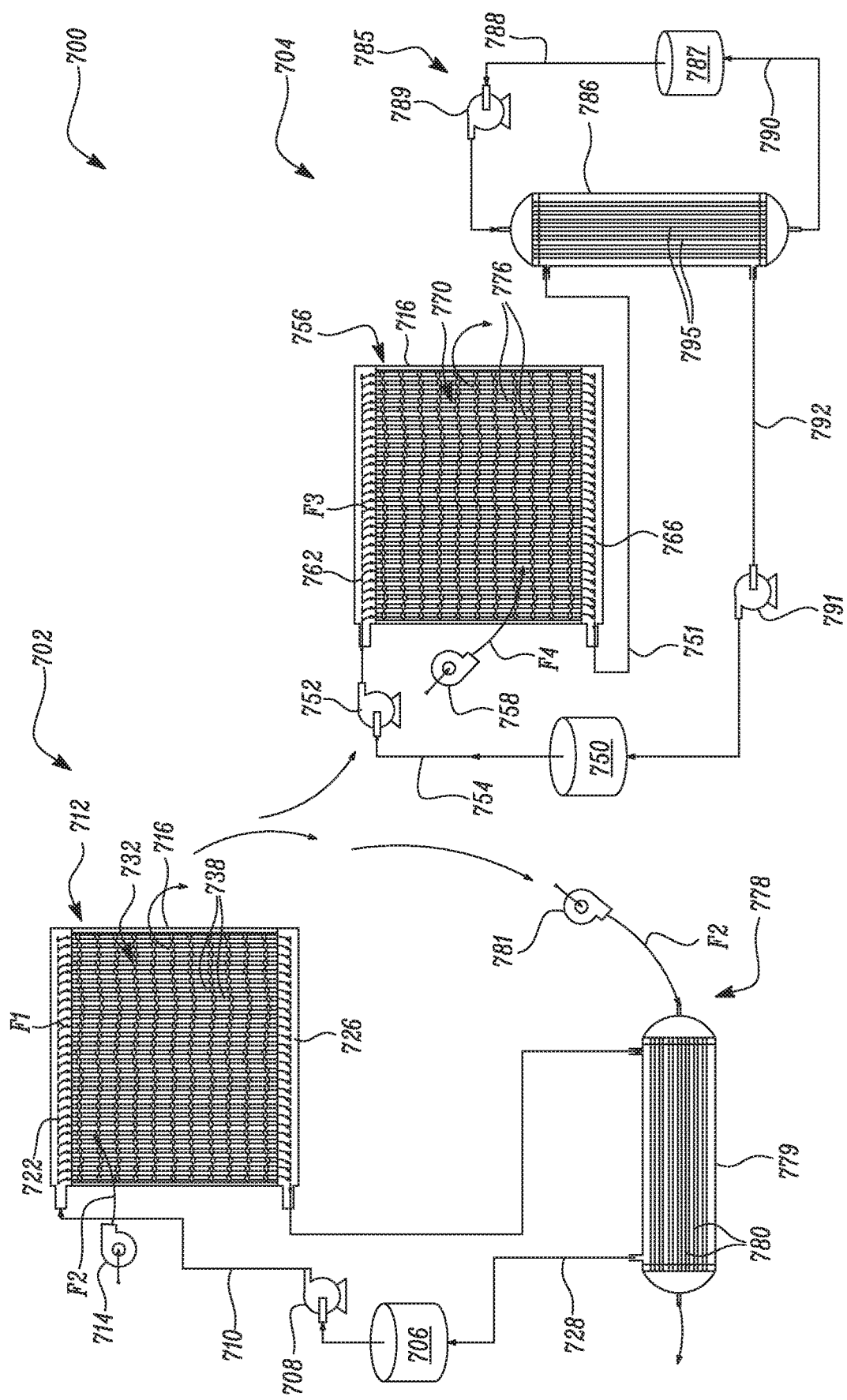
FIG. 7 illustrates a schematic view of a third contactor system including an evaporative contactor system having a chilling module and a dehumidification system having a regeneration module in accordance with some embodiments discussed herein.

FIG. 7 illustrates a schematic view of a third contactor system 700, according to an embodiment of the present disclosure. The third contactor system 700 includes a dehumidification system 702 and an evaporative cooling system 704. The dehumidification system 702 is similar in design to the dehumidification system 102 of the first contactor system 100 of FIG. 1. Further, the third contactor system 700 includes a first tank 706, a first pump 708, a first blower unit 714, a first fluid conduit 710, a second fluid conduit 728, and a first contactor panel 712 that is similar to the first tank 106, the first pump 108, the first blower unit 114, the first fluid conduit 110, the second fluid conduit 128, and the first contactor panel 112. The first pump 708 pressurizes the first fluid to introduce the pressurized first fluid in the first contactor panel 712. In the illustrated example, the first fluid is a liquid desiccant. In another example, the first fluid may be humid and hot air. Further, the first blower unit 714 directs a second fluid towards the first contactor panel 712. In the illustrated example, the second fluid is humid and hot air. In another example, the second fluid may be water.

Further, the first contactor panel 712 includes a first headspace 722, a second headspace 726, a membrane array 732, and a plurality of hollow fibers 738 similar to the first headspace 122, the second headspace 126, the membrane array 132, and the plurality of hollow fibers 138. During an operation of the dehumidification system 702, the first headspace 722 receives the first fluid from the first tank 706 via the first fluid conduit 710. The first headspace 722 directs the first fluid, such as the liquid desiccant, through a lumen (not shown) of each hollow fiber 738. A flow of the first fluid through the third contactor system 700 is illustrated by a first fluid flow "F1". The first fluid flows through the lumen of each hollow fiber 738 and is introduced in the second headspace 726. Further, the first blower unit 714 directs the second fluid, such as the hot and humid air, towards an exterior surface (not shown) of each hollow fiber 738. A flow of the second fluid through the third contactor system 700 is illustrated by a second fluid flow "F2". Based on the flow of the second fluid over the membrane array 732, a humidity of the second fluid decreases based on mass transfer between the first fluid and the second fluid. The second fluid that is released may be hot and dry air. The second headspace 726 in turn directs the first fluid towards the first tank 706 via the second fluid conduit 728.

Further, the third contactor system 700 includes a regeneration module 778 to increase a desiccant concentration of the liquid desiccant. The regeneration module 778 includes a first heat exchanger 779 having a number of tubes 780. The first heat exchanger 779 is disposed in the second fluid conduit 728. A second blower unit 781 directs the second fluid towards the first heat exchanger 779 such that the second fluid flows through the tubes 780 of the first heat exchanger 779. The first heat exchanger 779 receives the first fluid from the first contactor panel 712. Further, the first fluid flows over the tubes 780 of the first heat exchanger 779. As the first fluid flows over the tubes 780, the desiccant concentration of the liquid desiccant increases and the second fluid is converted to humid and hot air. The first fluid exiting the first heat exchanger 779 is directed towards the first tank 706 via the second fluid conduit 728.

Further, the evaporative cooling system 704 is similar in design to the dehumidification system 102 associated with the first contactor system 100 explained in reference to FIG. 1. The third contactor system 700 includes a second tank 750, a second pump 752, a third blower unit 758, a third fluid conduit 754, a fourth fluid conduit 751, and a second contactor panel 756 that is similar to the first tank 106, the first pump 108, the first blower unit 114, the first fluid conduit 110, the second fluid conduit 128, and the first contactor panel 112. The second pump 752 pressurizes a third fluid to introduce the pressurized third fluid in the second contactor panel 756. In the illustrated example, the third fluid is water. In another example, the third fluid may be a portion of the dry and hot air being released by the dehumidification system 702. Further, the third blower unit 758 directs a fourth fluid towards the second contactor panel 756. In the illustrated example, the fourth fluid is a portion of the dry and hot air being released by the dehumidification system 702. In another example, the fourth fluid may be water.

Further, the second contactor panel 756 includes a first headspace 762, a second headspace 766, a membrane array 770, and a plurality of hollow fibers 776 similar to the first headspace 122, the second headspace 126, the membrane array 132, and the plurality of hollow fibers 138. During an operation of the evaporative cooling system 704, the first headspace 762 receives the third fluid from the second tank 750. The first headspace 762 directs the third fluid, such as water, through a lumen (not shown) of each hollow fiber 776. A flow of the third fluid through the third contactor system 700 is illustrated by a third fluid flow "F3". The third fluid flows through the lumen of each hollow fiber 776 and is introduced in the second headspace 766. Further, the third blower unit 758 directs the fourth fluid, such as hot and dry air, towards an exterior surface (not shown) of each hollow fiber 776. A flow of the fourth fluid through the third contactor system 700 is illustrated by a fourth fluid flow "F4". Based on the flow of the fourth fluid over the membrane array 770, a temperature and a humidity of the fourth fluid decreases based on heat transfer and mass transfer between the third fluid and the fourth fluid.

Further, the third contactor system 700 includes a chilling module 785 adapted to decrease a temperature of the third fluid. The chilling module 785 is similar to the chilling module 640 described in relation to the second contactor system 600 of FIG. 6A. The chilling module 785 includes a second heat exchanger 786 having a number of tubes 795, a coolant reservoir 787, a first fluid pipe 788, a third pump 789, a second fluid pipe 790, a third fluid pipe 792, a fourth fluid pump 791. The third pump 789 is adapted to pump a coolant, such as chilled water, towards the second heat exchanger 786 via the first fluid pipe 788. The coolant flows through the tubes 795 and is directed towards the second heat exchanger 786 via the second fluid pipe 790. Further, the second heat exchanger 786 receives the third fluid exiting the second contactor panel 756 via the fourth fluid conduit 751. The third fluid received within the second heat exchanger 786 flows over the tubes 795. As the third fluid flows over the tubes 795, a temperature of the third fluid decreases. Further, the third fluid pipe 792 directs the third fluid that is at a lower temperature towards the second tank 750 from where the third fluid may be directed towards the second contactor panel 756. The fourth fluid pump 791 pressurized the third fluid towards the second tank 750.

Figure 8:
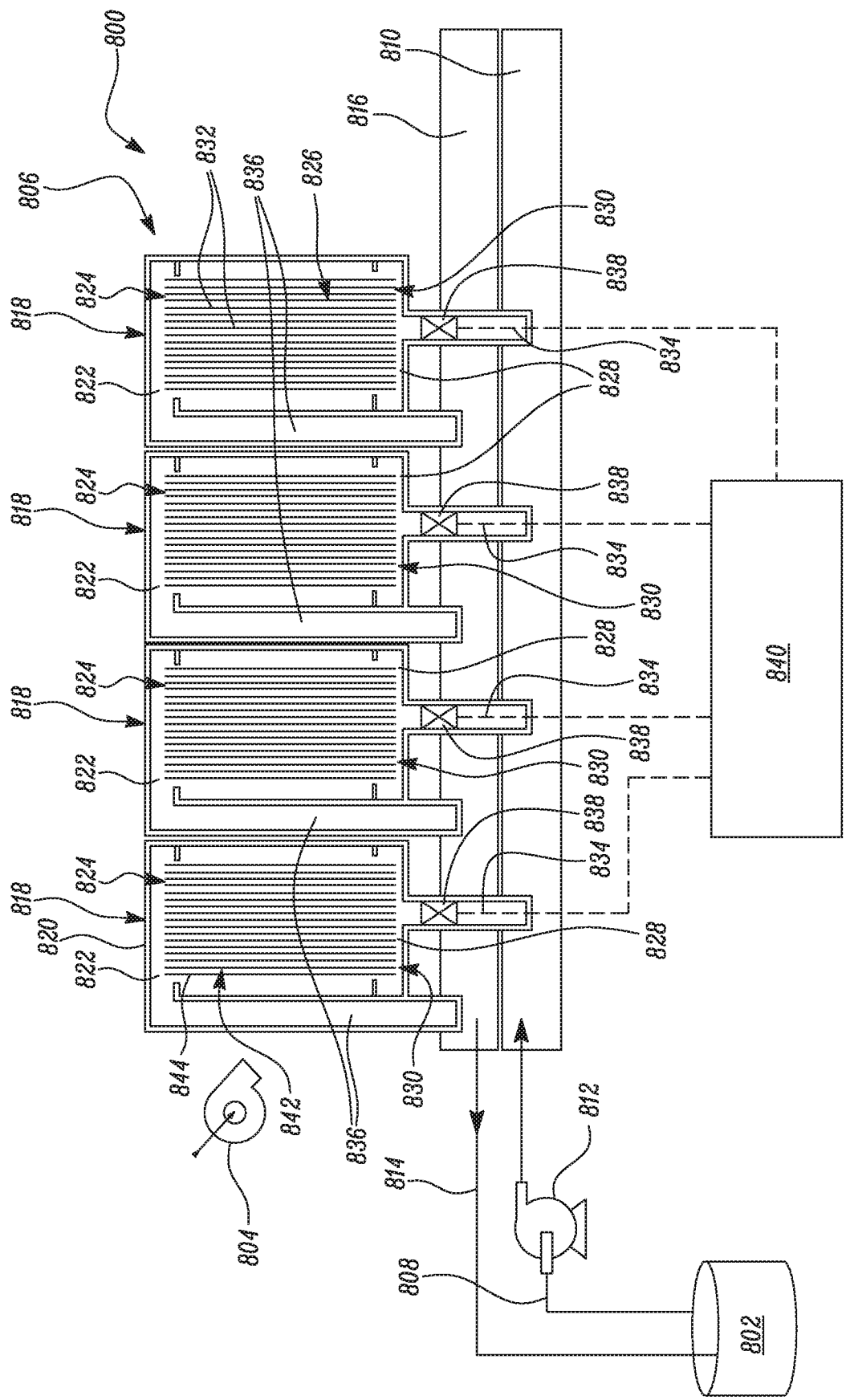
FIG. 8 illustrates a fourth contactor system including a contactor panel array having a number of contactor panels in accordance with some embodiments discussed herein.

FIG. 8 illustrates a fourth contactor system 800, according to an embodiment of the present disclosure. The fourth contactor system 800 may be hereinafter interchangeably referred to as the contactor system 800. In one example, the fourth contactor system 800 may be an evaporative cooling system. Such an evaporative cooling system may be similar to the evaporative system 104 associated with the first contactor system 100 of FIG. 1. In another example, the fourth contactor system 800 may be a dehumidification system. Such a dehumidification system may be similar to the dehumidification system 102 associated with the first contactor system 100 of FIG. 1. The contactor system 800 includes a tank 802 adapted to hold a first fluid therein. In one example, the first fluid is at least one of a liquid and a gas. Further, the first fluid may include a liquid, a gas, a sweep gas, air, forced air, a vacuum, or combinations thereof. The liquid may include, for example, a cold and/or absorbent liquid, a salt solution, a hot and/or humidifying liquid, or a liquid desiccant. A type of the first fluid may vary based on an application of the contactor system 800. Further, the contactor system 800 may also include a chilling module (not shown) that is similar to the chilling module 640 of the contactor system 600 explained in relation to FIG. 6A. Such a chilling module may be used to lower a temperature of the first fluid being directed towards each contactor panel 818.

Further, the fourth contactor system 800 includes a blower unit 804 adapted to direct a second fluid towards at least one contactor panel array 806. Although, a single blower unit 804 is illustrated herein, it should be noted that each contactor panel 818 may include individual blower units, without any limitations. In one example, the second fluid is at least one of a liquid and a gas. Further, the second fluid may include a liquid, a gas, a sweep gas, air, forced air, a vacuum, or combinations thereof. The liquid may include, for example, a cold and/or absorbent liquid, a salt solution, a hot and/or humidifying liquid, or a liquid desiccant. A type of the second fluid may vary based on an application of the contactor system 800.

Further, the contactor system 800 includes a first manifold 810 in selective fluid communication with a first end portion 830 of a membrane array 826 of each contactor panel 818 based on an operation of a valve assembly 838. The first manifold 810 is adapted to direct the first fluid towards the membrane array 826 of each contactor panel 818. Further, the contactor system 800 includes a second manifold 816 in direct fluid communication with a second end portion 824 of the membrane array 826 of each contactor panel 818. The second manifold 816 is adapted to receive the first fluid from the membrane array 826 of each contactor panel 818. The contactor system 800 also includes an inlet conduit 808 adapted to provide fluid communication between the tank 802 and the first manifold 810.

Further, a pump 812 is fluidly disposed between the inlet conduit 808 and the tank 802. The pump 812 is positioned in the inlet conduit 808 and the tank 802. The pump 812 pressurizes the first fluid to introduce the pressurized first fluid in the first manifold 810. The contactor system 800 also includes an outlet conduit 814 adapted to provide fluid communication between the tank 802 and the second manifold 816. Further, the fourth contactor system 800 includes the at least one contactor panel array 806. In the illustrated embodiment, the fourth contactor system 800 includes a single contactor panel array 806 having a plurality of contactor panels 818. The contactor panel array 806 includes the plurality of contactor panels 818 disposed adjacent to each other. Further, the tank 802 is in fluid communication with each contactor panel 818 via the inlet conduit 808 and the first manifold 810 for directing the first fluid towards each contactor panel 818. The tank 802 is also in fluid communication with each contactor panel 818 via the outlet conduit 814 and the second manifold 816 for directing the first fluid from each contactor panel 818 towards the tank 802.

Further, as described above the fourth contactor system 800 includes the plurality of contactor panels 818. Each contactor panel 818 is similar to the first contactor panel 112 associated with the first contactor system 100 shown in FIG. 1. Each contactor panel 818 includes a frame member 820. The frame member 820 may be square or rectangular in shape. The frame member 820 of each contactor panel 818 defines a first headspace 828 that provides fluid communication between the first manifold 810 and the first end portion 830 of the membrane array 826. Further, the frame member 820 of each contactor panel 818 defines a second headspace 822 that provides fluid communication between the second manifold 816 and the second end portion 824 of the membrane array 826.

Each contactor panel 818 includes the membrane array 826 adapted to be received within the frame member 820. The membrane array 826 extends between the first headspace 828 and the second headspace 822. The membrane array 826 defines the first end portion 830 and the second end portion 824. The first end portion 830 is in fluid communication with the first headspace 828 and the second end portion 824 is in fluid communication with the second headspace 822. The membrane array 826 includes a plurality of hollow fibers 832.

Further, the membrane array 826 of each contactor panel 818 is similar to the hollow fiber membrane array described in the '302 patent. It should be noted that details corresponding to a design, material, and manufacturing of the membrane array 826 is similar to a design, material, and manufacturing of the hollow fiber membrane array described in the '302 patent. The membrane array 826 of each contactor panel 818 is a microporous, hydrophobic, hollow fiber membrane array. The membrane array 826 of each contactor panel 818 includes at least one membrane layer that is similar to the membrane layer 148 explained in relation to FIG. 2C. The at least one membrane layer includes the plurality of hollow fibers 832. In some examples, each contactor panel 818 includes a plurality of membrane layers disposed adjacent to each other. The membrane array 826 of each contactor panel 818 is at least one of wound, pleated, and folded. More particularly, the membrane layers may be folded, pleated, or wound to form the membrane array 826 along a depth of the membrane array 826. In the illustrated embodiment, the membrane array 826 includes sixty membrane layers, without any limitations. In another embodiment, the membrane array 826 may include twenty membrane layers or forty membrane layers, as per application requirements. Further, each membrane layer may include eight hollow fibers 832. It may be contemplated that a total number of the membrane layers and a total number of the hollow fibers 832 may vary, as per application requirements. The number of membrane layers and the hollow fibers 832 may depend upon a desired efficiency of the contactor panel 818. It should be noted that, in some examples, the efficiency of the contactor panel 818 may be increased by increasing the membrane layers and the hollow fibers 832.

The membrane array 826 includes the plurality of hollow fibers 832. Further, each hollow fiber 832 includes a lumen 842 adapted to receive the first fluid. The lumen 842 may be hereinafter interchangeably referred to as a first portion 842. Moreover, each hollow fiber 832 includes an exterior surface 844 adapted to contact a second fluid. The exterior surface 844 may be hereinafter interchangeably referred to as a second portion 844. The blower unit 804 is adapted to direct the second fluid towards the exterior surface 844 of each hollow fiber 832. A wall of each hollow fiber 832 separates the lumen 842 and the exterior surface 844. The plurality of hollow fibers 832 are knitted together to form the membrane array 826. The hollow fibers 832 are knitted similar to the knitting techniques described in relation to FIGS. 5A and 5B.

Further, each contactor panel 818 includes a first conduit 834 fluidly connecting the first manifold 810 and the first end portion 830 of the membrane array 826. The first conduit 834 may include a pipe or a tube that provides fluid communication between the first manifold 810 and the first end portion 830 of the membrane array 826. The first fluid exiting the tank 802 is received by the first end portion 830 via the inlet conduit 808, the first manifold 810, the first headspace 828, and the first conduit 834. Moreover, each contactor panel 818 also includes a second conduit 836 fluidly connecting the second manifold 816 and the second end portion 824 of the membrane array 826. The second conduit 836 may include a pipe or a tube that provides fluid communication between the second manifold 816 and the second end portion 824 of the membrane array 826. The first fluid exiting the membrane array 826 is received by the tank 802 via the second headspace 822, the second conduit 836, the second manifold 816, and the outlet conduit 814. It should be noted that a location of the first and second conduits 834, 836 illustrated herein is exemplary in nature. Accordingly, the first and second conduits 834, 836 may be connected to a side surface, a front surface, or a rear surface of the frame member 820.

Further, each contactor panel 818 includes the valve assembly 838 in fluid communication with the first end portion 830 of the membrane array 826. The valve assembly 838 is disposed in the first conduit 834 and provides selective fluid communication between the first manifold 810 and the first end portion 830 of the membrane array 826. The valve assembly 838 may include a solenoid that may be energized/deenergized to open or close the valve assembly 838. The valve assembly 838 may be opened to provide fluid communication between the first manifold 810 and the first end portion 830 of the membrane array 826. Further, the valve assembly 838 may be closed to restrict fluid communication between the first manifold 810 and the first end portion 830 of the membrane array 826. It should be noted that the contactor panel 818 may be activated or deactivated based on opening or closing of the corresponding valve assembly 838. The opening of the valve assembly 838 causes the first fluid to flow through the hollow fibers 832. Further, the second fluid contacts the first fluid causing the mass and/or heat transfer based on the contact between the first and second fluids. Thus, one more characteristics of the second fluid may vary based on the contact between the first and second fluids. Further, when the valve assembly 838 is closed, the contactor panel 818 may not cause any change in the mass and/or heat content of the second fluid.

The contactor system 800 includes a controller 840 configured to provide selective fluid communication between the first manifold 810 and the first end portion 830 of the membrane array 826 of each contactor panel 818. The controller 840 is communicably coupled with the valve assembly 838 of each contactor panel 818. More particularly, the controller 840 may be communicably coupled with the solenoids of the respective valve assemblies 838. The controller 840 is configured to selectively control the valve assembly 838 of at least one contactor panel 818. More particularly, one or more contactor panels 818 may be activated or deactivated based on control of the valve assembly 838 associated with the corresponding contactor panel 818. The controller 840 is configured to selectively control the valve assembly 838 of the at least one contactor panel 818 based on at least one of a high thermal load location, a target temperature, a target humidity, and a temperature uniformity metric. More particularly, the one or more contactor panels 818 may be activated or deactivated based on control of the valve assembly 838 associated with the corresponding contactor panels 818 so that a temperature or a humidity at the high thermal load location may be lowered or the temperature uniformity metric may be brought closer to its ideal value of 100%. Useful temperature uniformity metrics can include return temperature index (RTI®), rack cooling index-high (RHI®), or rack cooling index-low (RCI®).

Further, one or more contactor panels 818 may be activated based on the target temperature, the target humidity, and/or the temperature uniformity metric. The target temperature, the target humidity, and/or the temperature uniformity metric may be based on a desired efficiency. The controller 840 is also configured to control the valve assembly 838 to vary a flow rate of the first fluid flowing through the valve assembly 838 of the at least one contactor panel 818. The flow rate of the first fluid may depend on the high thermal load location, the target temperature, the target humidity, and/or the temperature uniformity metric. For this purpose, the controller 840 may control a degree of opening of the valve assembly 838 associated with the contactor panel 818 that needs to be activated. Based on the control of the degree of opening of one or more valve assemblies 838, the temperature and/or humidity may be efficiently controlled as per requirements.

In one example, wherein the contactor system 800 is embodied as the evaporative cooling system, the contactor system 800 may be used to vary the temperature and humidity of the second fluid based on the heat and mass transfer between the first and second fluids. A control of the contactor system 800 by the controller 840 will now be explained. For exemplary purposes, a control technique applied by the controller 840 is illustrated in reference to the evaporative cooling system, however, the details provided herein are equally applicable to other systems such as a dehumidification system, a humidification system, or a heating system. It should be noted that the contactor panels 818 may be activated or deactivated based on the high thermal load location, the target temperature, the target humidity, and/or the temperature uniformity metric. If the target temperature is higher than a current temperature setting, the controller 840 may open the valve assembly 838 of some contactor panels 818. Accordingly, some of the contactor panels 818 will be in an activated state. The contactor panels 818 in the activated state may release cool and humid air, whereas the contactor panels 818 in the deactivated state may simply allow passage of dry and hot air. Thus, the cool and humid air may blend with the dry and hot air to increase the current temperature to the target temperature. Further, if the target temperature corresponds to a lowest temperature setting, the controller 840 may open the valve assembly 838 of all the contactor panels 818. Accordingly, all the contactor panels 818 will be in an activated state to release cool and humid air to lower the current temperature to the target temperature. Thus, it should be noted that a number of the contactor panels 818 that need to be operated in the activated state may depend on the high thermal load location, the target temperature, the target humidity, and/or the temperature uniformity metric. In some examples, the controller 840 may operate such that a uniform temperature/humidity is maintained across a room or area. Further, in another example, wherein the contactor system 800 is a dehumidification system, the contactor panels 818 may be activated or deactivated to vary the humidity of the second fluid based on the mass transfer between the first and second fluids.

Figure 9:
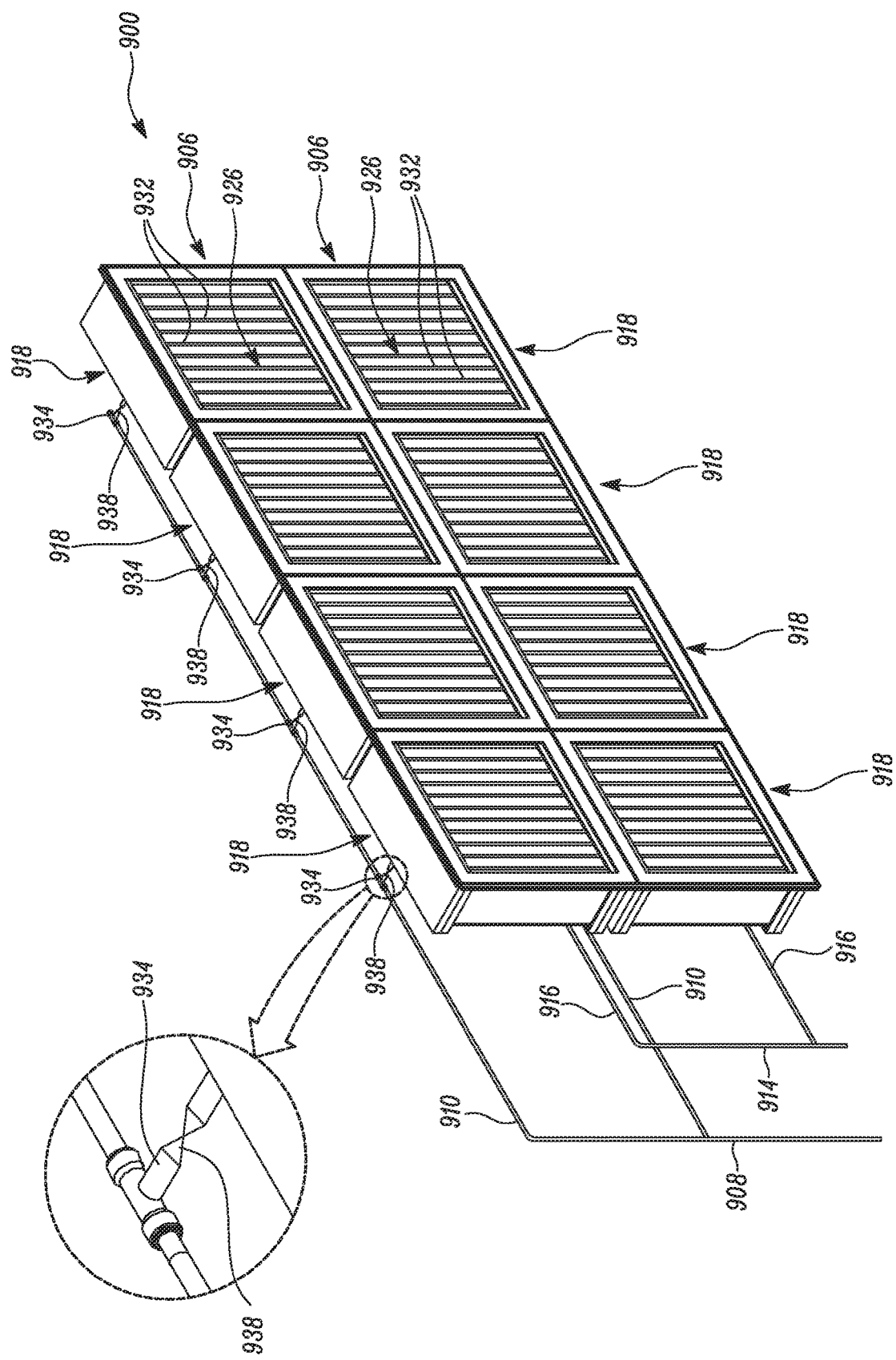
FIG. 9 illustrates a fifth contactor system including a number of contactor panel arrays in accordance with some embodiments discussed herein.

FIG. 9 illustrates another embodiment of the present disclosure. In this embodiment, a contactor system 900 includes a plurality of contactor panel arrays 906 spaced apart from each other. In the illustrated embodiment, the contactor system 900 includes three contactor panel arrays 906. However, a total number of the contactor panel arrays 906 may vary as per application requirements. Further, each contactor panel array 906 includes four contactor panels 918. Each contactor panel 918 includes a membrane array 926 similar to the membrane array 132 associated with the first contactor system 100 described in relation to FIG. 1. Further, the membrane array 926 includes a plurality of hollow fibers 932.

The contactor system 900 includes an inlet conduit 908, an outlet conduit 914, a pump (not shown), and a blower unit (not shown) similar to the inlet conduit 808, the outlet conduit 814, the pump 812, and the blower unit 804 associated with the fourth contactor system 800. Further, the plurality of contactor panel arrays 906 includes different first manifolds 910 and different second manifolds 916. More particularly, the contactor system 900 includes three first manifolds 910 and three second manifolds 916. Each first manifold 910 is in fluid communication with the inlet conduit 908. Moreover, each contactor panel 918 is in fluid communication with the first manifold 910 via a first conduit 934. Further, each second manifold 816 is in fluid communication with the outlet conduit 914. Moreover, each contactor panel 918 is in fluid communication with the second manifold 816 via a second conduit (not shown) that is similar to the first conduit 934.

A valve assembly 938 is disposed in the first conduit 834. An operation and details of the valve assembly 938 is similar to the valve assembly 838 of the fourth contactor system 800 described in relation to FIG. 8. The contactor system 900 also includes a controller (not shown). The controller controls the valve assembly 938 of each contactor panel 918 to activate or deactivate one or more contactor panels 918 based on application requirements. It should be noted that installation of multiple contactor panels 818, 918 and multiple contactor panel arrays 806, 906 instead of the single contactor panel may demonstrate improved efficiency, allow easier replacement of the contactor panels 818, 918, convenient storage/handling of the contactor panels 818, 918, lower replacement costs, and/or the like. Further, the contactor system 800, 900 may allow improved control over the temperature and the humidity of the second fluid being released by the contactor panel 818, 918. It should be noted that the contactor systems 800, 900 may allow judicious utilization of the first fluid as the contactor panels 819, 918 may be selectively activated. Moreover, the contactor system 800, 900 may also allow recirculation of water at a constant temperature due to installation of common first manifolds 810, 910 and second manifolds 816, 916. Further, the control of the flow rate of the first fluid, and in some cases the temperature of the first fluid, may allow efficient running of the contactor system 800, 900 at partial and/or low load conditions.

Further, the contactor system 800, 900 described herein provides increased usability rate as a drying time associated with the contactor panel 818, 918 may be lower as compared to conventional contactor panels. The increase in usability rate may in turn allow precise control of the temperature and humidity of the second fluid. For example, as the membrane array 826, 926 associated with the contactor panel 818, 918 may dry at a faster rate, the second fluid being released by the contactor panel 818, 918 may reach the target temperature and humidity in a shorter time period.

Figure 10A:
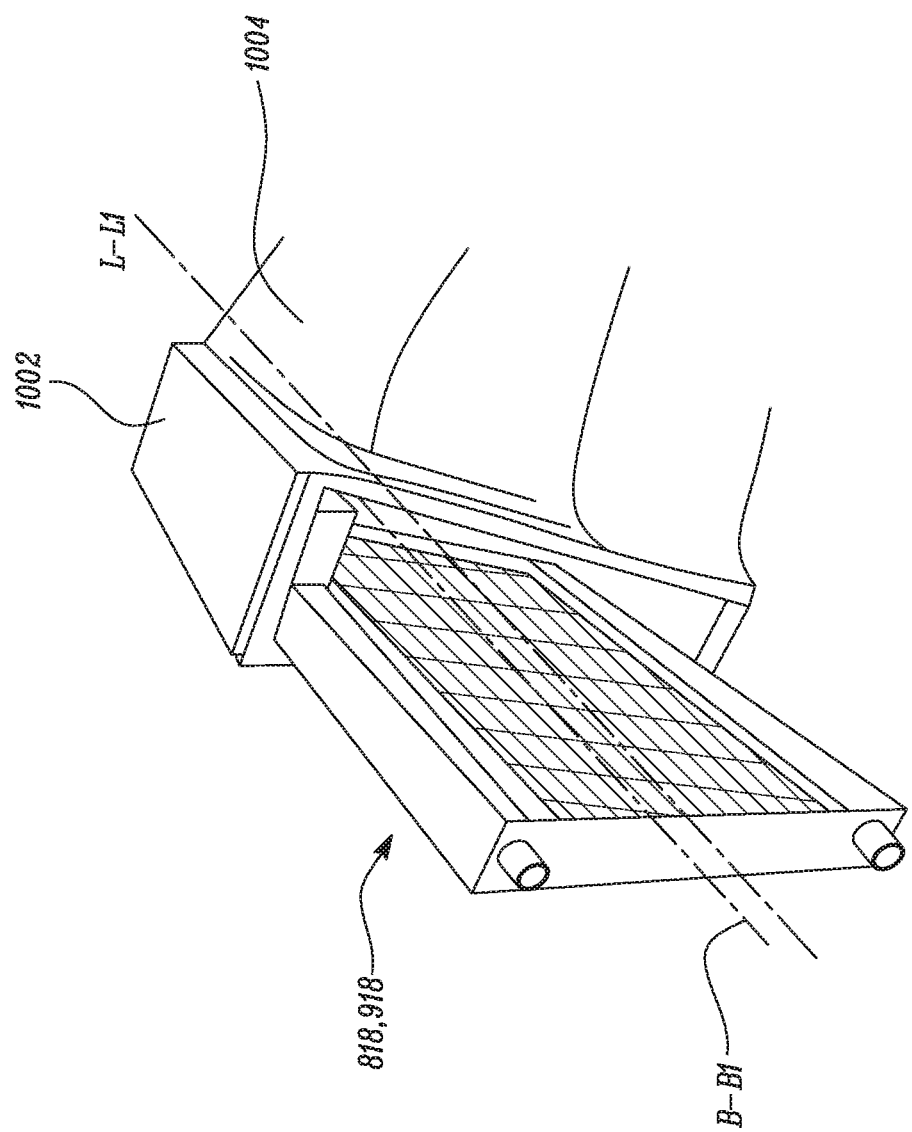
FIGS. 10A and 10B illustrate a housing member and a contactor panel being received within the housing member in accordance with some embodiments discussed herein.
Figure 10B:
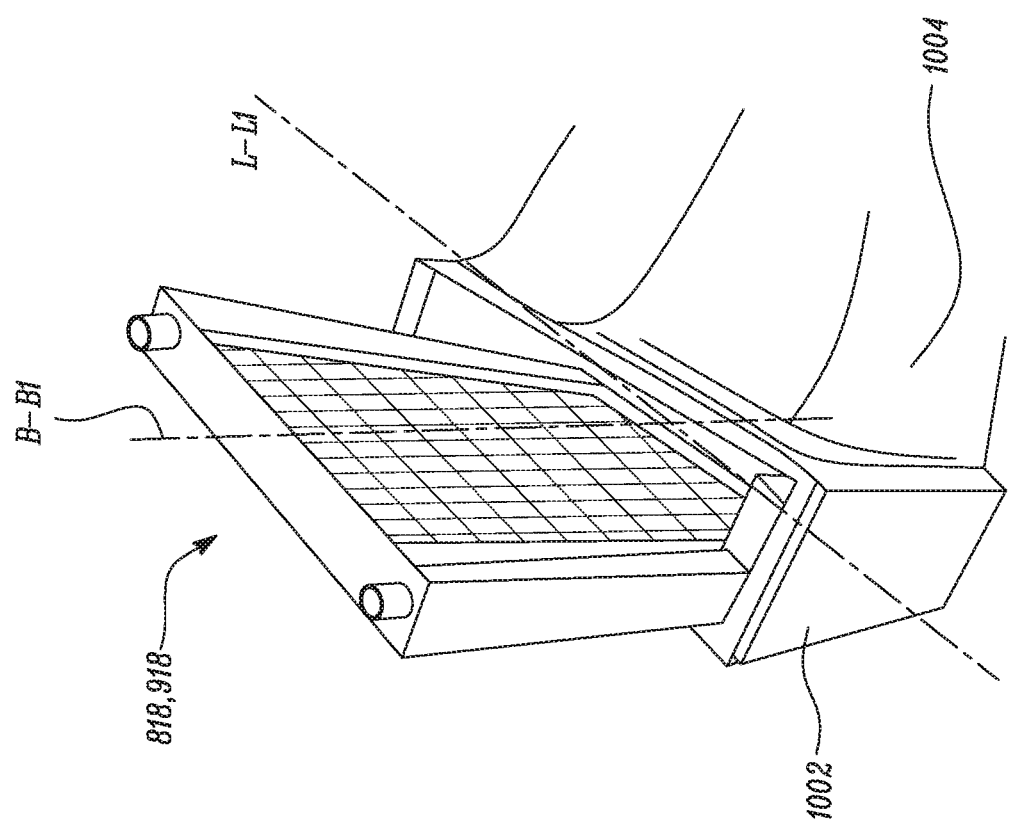

As illustrated in FIGS. 10A and 10B, a housing member 1002 is adapted to receive at least one contactor panel 818 (see FIG. 8) or at least one contactor panel 918 (see FIG. 9) of the plurality of contactor panels 818, 918. The housing member 1002 defines a first longitudinal axis "L-L1". A dimension of the housing member 1002 described herein is exemplary in nature, and the dimension of the housing member 1002 may vary as per application requirements. The housing member 1002 may receive a single contactor panel 818, 918 or a pair of the contactor panels 818, 918. It should be noted that an orientation of the contactor panel 818, 918 relative to the housing member 1002 may be varied based on application requirements. More particularly, as the contactor panel 818, 918 is associated with the contactor system 800, 900 embodied as a closed loop system, the contactor panel 818, 918 may be installed in various orientations as evident from FIGS. 10A to 10D. In one example, as illustrated in FIG. 10A, the contactor panel 818, 918 is positioned within the housing member 1002 such that each hollow fiber 832, 932 (see FIGS. 8 and 9) of the membrane array 826, 926 of the at least one contactor panel 818, 918 defines a second longitudinal axis "B-B1" that extends substantially perpendicular to the first longitudinal axis "L-L1" defined by the housing member 1002. In another example, as illustrated in FIG. 10B, the contactor panel 818, 918 is positioned within the housing member 1002 such that each hollow fiber 832, 932 (see FIGS. 8 and 9) of the membrane array 826, 926 of the at least one contactor panel 818, 918 defines the second longitudinal axis "B-B1" that extends substantially parallel to the first longitudinal axis "L-L1" defined by the housing member 1002.

Figure 10C:
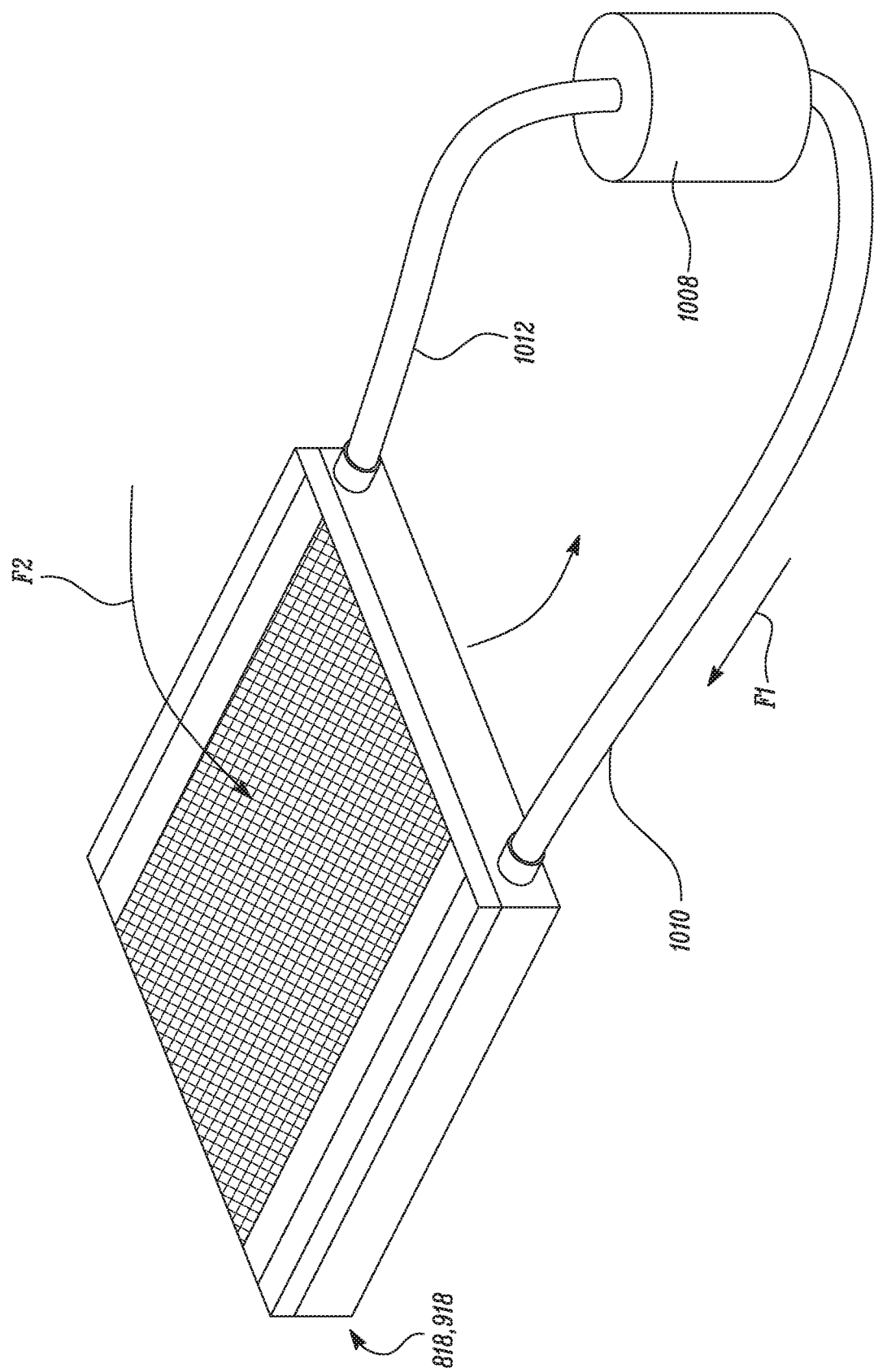

Referring now to FIG. 10C, the contactor panel 818, 918 may also be disposed horizontally. In such examples, the first fluid from a tank 1008 may be pressurized and directed towards the contactor panel 818, 918 via a first fluid conduit 1010. The first fluid returns to the tank 1008 via a second fluid conduit 1012. The tank 1008, the first fluid conduit 1010, and the second fluid conduit 1012 may be similar to the first tank 106, the first fluid conduit 110, and the second fluid conduit 128 of the contactor system 100 described in relation to FIG. 1. A flow of the first fluid through the contactor panel 818, 918 is illustrated by the first fluid flow "F1". Further, the second fluid may flow over the contactor panel 818, 918. A flow of the second fluid is illustrated by the second fluid flow "F2". Thus, the contactor panel 818, 918 described herein may be used in applications that have limitations in terms of vertical space availability or applications that demand installation of the contactor panel 818, 918 in a specific orientation based on a shape, a size, and an orientation of the housing member 1002 (see FIGS. 10A and 10B) that receives the contactor panel 818, 918.

As shown in FIG. 10D, the contactor panel 818, 918 may be disposed in an angular orientation. In such examples, the first fluid from the tank 1008 may be pressurized and directed towards the contactor panel 818, 918 via the first fluid conduit 1010. The first fluid returns to the tank 1008 via the second fluid conduit 1012. The flow of the first fluid through the contactor panel is illustrated by the first fluid flow "F1". Further, the second fluid may flow over the contactor panel 818, 918. The flow of the second fluid is illustrated by the second fluid flow "F2". Thus, the contactor panel 818, 918 described herein may be used in applications that demand installation of the contactor panel 818, 918 in a specific orientation based on the shape, the size, and the orientation of the housing member 1002 (see FIGS. 10A and 10B) that receives the contactor panel 818, 918.

Figure 11:
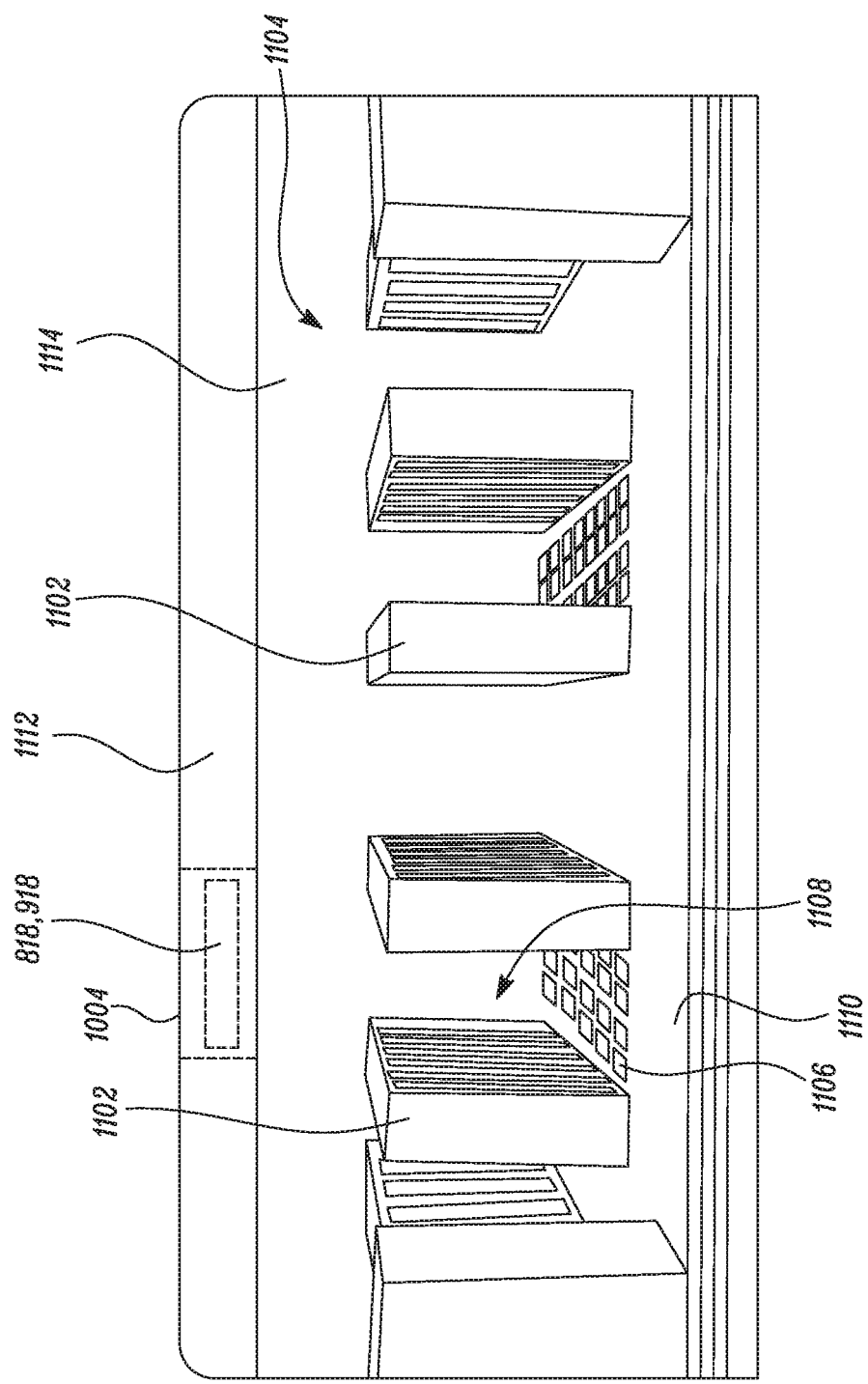
FIG. 11 illustrates a room equipped with contactor panels in accordance with some embodiments discussed herein.

Referring now to FIG. 11, in one example, the housing member 1002 is disposed proximate an area towards which the second fluid need to be directed. Thus, the contactor panels 818, 918 may be arranged such that one or more contactor panels 818, 918 are received within the housing member 1002 proximate the area towards which the second fluid need to be directed. Further, FIG. 11 illustrates a number of electronic devices 1102, such as servers, installed in a room 1104. The room 1104 may embody a data center. Further, the housing member 1002 is disposed in at least one of a ceiling 1112, a floor 1110, and a wall 1114 of the room 1104. The room 1104 may include a number of hot spots that may typically have a high temperature. In some examples, the contactor panels 818, 918 may be arranged proximate such hot spots in the room 1104. The housing member 1002 may receive one or more contactor panels 818, 918. The positioning of the housing member 1002, and more specifically the one or more contactor panels 818, 918, in the ceiling 1112, the floor 1110, and/or the wall 1114 of the room 1104 may allow the room 1104 to reach a uniform temperature/humidity or the target temperature/humidity. Further, the room 1104 may include a number of the contactor panels 818, 918. As illustrated, the one or more contactor panels 818, 918 is positioned proximate an aisle 1108. Further, grills 1106 may be provided in alignment with the aisle 1108 to allow air, such as cool and humid air, to be directed towards the room 1104. More particularly, the contactor panels 818, 918 is positioned in the ceiling 1112. However, the contactor panels 818, 918 may also be positioned within the floor 1110 or the wall 1114. In some examples, the room 1104 may have designated hot spots and the contactor panel 818, 918 may be positioned proximate such designated hot spots.

It should be further noted that the contactor panels 818, 918 may be selectively controlled using the valve assembly, similar to the valve assembly 838 (see FIG. 8) and a controller, similar to the controller 840 (see FIG. 8), in order to activate the contactor panels 818, 918 to maintain the uniform temperature/humidity and/or to achieve the target temperature/humidity. The arrangement illustrated herein allows positioning of the contactor panels 818, 918 proximate the area towards which the second fluid is directed so that the uniform temperature/humidity can be maintained in the entire area in an efficient and economic manner while utilizing low amount of fan power, water usage, and may result in an increase in a coefficient of performance of the evaporative cooling system.

Figure 12:
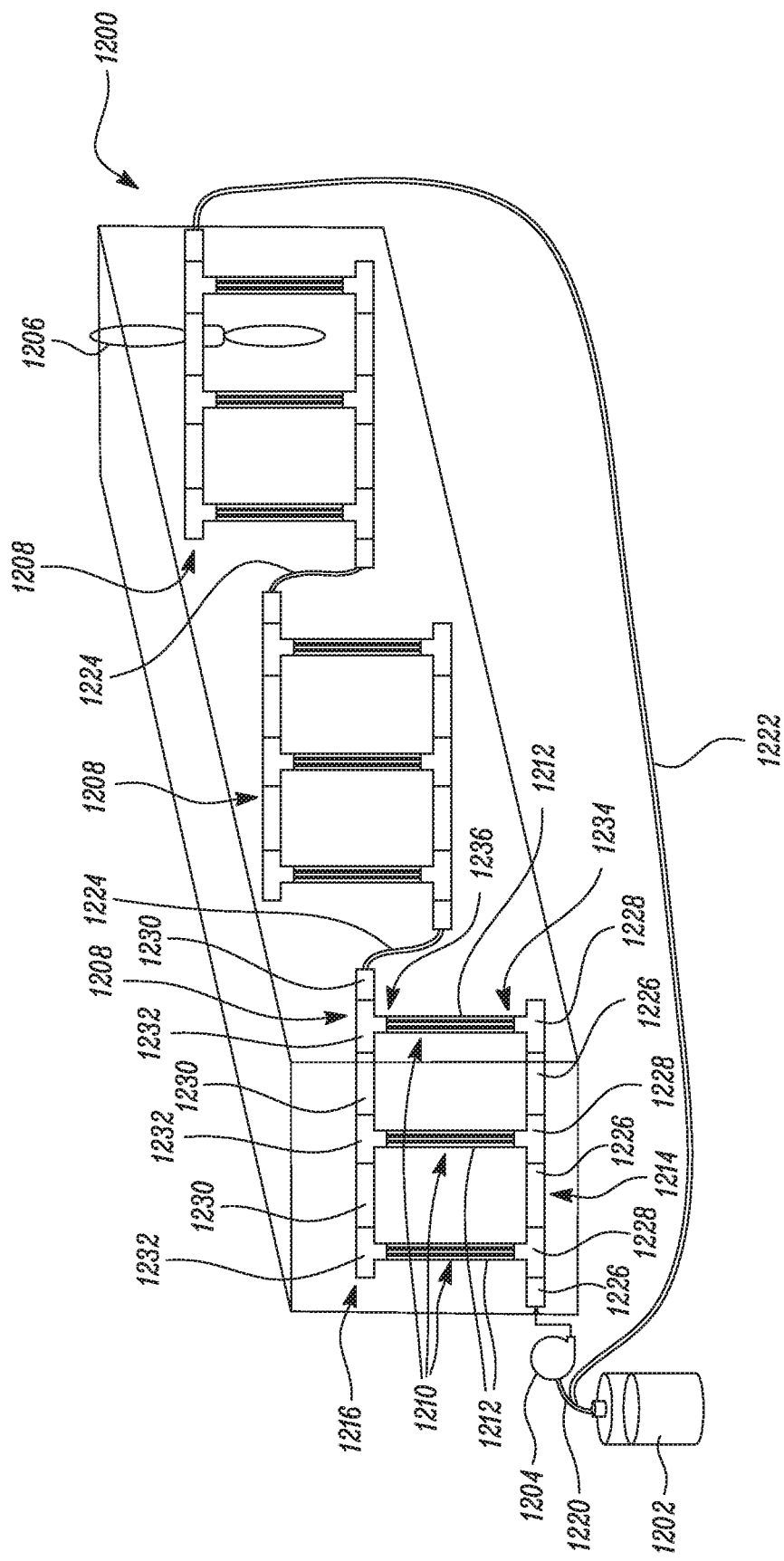
FIG. 12 illustrates another embodiment of a contactor system in accordance with some embodiments discussed herein.

FIG. 12 illustrates yet another embodiment of a contactor system 1200. In this embodiment, the contactor system 1200 includes a tank 1202, a pump 1204, and a blower unit 1206 similar to the first tank 106, the first pump 108, and the first blower unit 114 of the contactor system 100 explained in relation to FIG. 1. Further, the contactor system 100 includes a number of contactor panel arrangements 1208. The contactor system 1200 illustrated herein includes three contactor panel arrangements 1208. However, a total number of the contactor panel arrangements 1208 may vary as per application requirements. Further, each contactor panel arrangement 1208 includes a number of membrane arrays 1210. In the illustrated example, each contactor panel arrangement 1208 includes three membrane arrays 1210. Further, each membrane array 1210 is embodied as a bundle having a number of hollow fibers 1212. Each hollow fiber 1212 is similar to the hollow fiber 138 associated with the contactor system 100 described in relation to FIG. 2B.

Further, each contactor panel arrangement 1208 includes a first headspace 1214 and a second headspace 1216. A frame member (not shown) may support the membrane arrays 1210, the first headspace 1214, and the second headspace 1216. In the illustrated example, the first and second headspaces 1214, 1216 are in fluid communication with the tank 1202. More particularly, a first fluid conduit 1220 fluidly connects the tank 1202 with the first headspace 1214. The pump 1204 is disposed in the first fluid conduit 1220. Further, a second fluid conduit 1222 fluidly connects the tank 1202 with the second headspace 1216. Each contactor panel arrangement 1208 is in fluid communication with an adjacent contactor panel arrangement 1208 by a fluid pipe 1224. In the illustrated example, the second headspace 1216 is in fluid communication with the first headspace 1214 of the adjacent contactor panel arrangement 1208 by the fluid pipe 1224. In other examples, the second headspace 1216 may be in fluid communication with the second headspace 1216 of the adjacent contactor panel arrangement 1208 by the fluid pipe 1224. In yet other examples, the first headspace 1214 may be disposed in fluid communication with the first headspace 1214 or the second headspace 1216 of the adjacent contactor panel arrangement 1208 by the fluid pipe 1224.

Further, the first headspace 1214 includes a number of first conduits 1226 and a number of second conduits 1228 in fluid communication with each other. The second conduits 1228 are in fluid communication with the membrane arrays 1210. The second headspace 1216 includes a number of third conduits 1230 and a number of fourth conduits 1232 in fluid communication with each other. The fourth conduits 1232 are in fluid communication with the membrane arrays 1210.

Further, in order to couple each membrane array 1210 with the first and second headspaces 1214, 1216, a first end 1234 and a second end 1236 of each hollow fiber 1212 is potted sealed with the second and fourth conduits 1228, 1232, respectively, using a potting material. The ends 1234, 1236 may be embedded in a resin by potting methods, such as gravity potting method, mold potting method, centrifugal potting method, and the like. The potting material may include epoxy, thermoplastics, polyurethane, etc. The potting material may seal each hollow fiber 1212 to the first headspace 1214 and the second headspace 1216. It should be noted that the ends 1234, 1236 are potted sealed such that a lumen of each hollow fiber 1212 is in fluid communication with the first headspace 1214 and the second headspace 1216, respectively.

Figure 13:
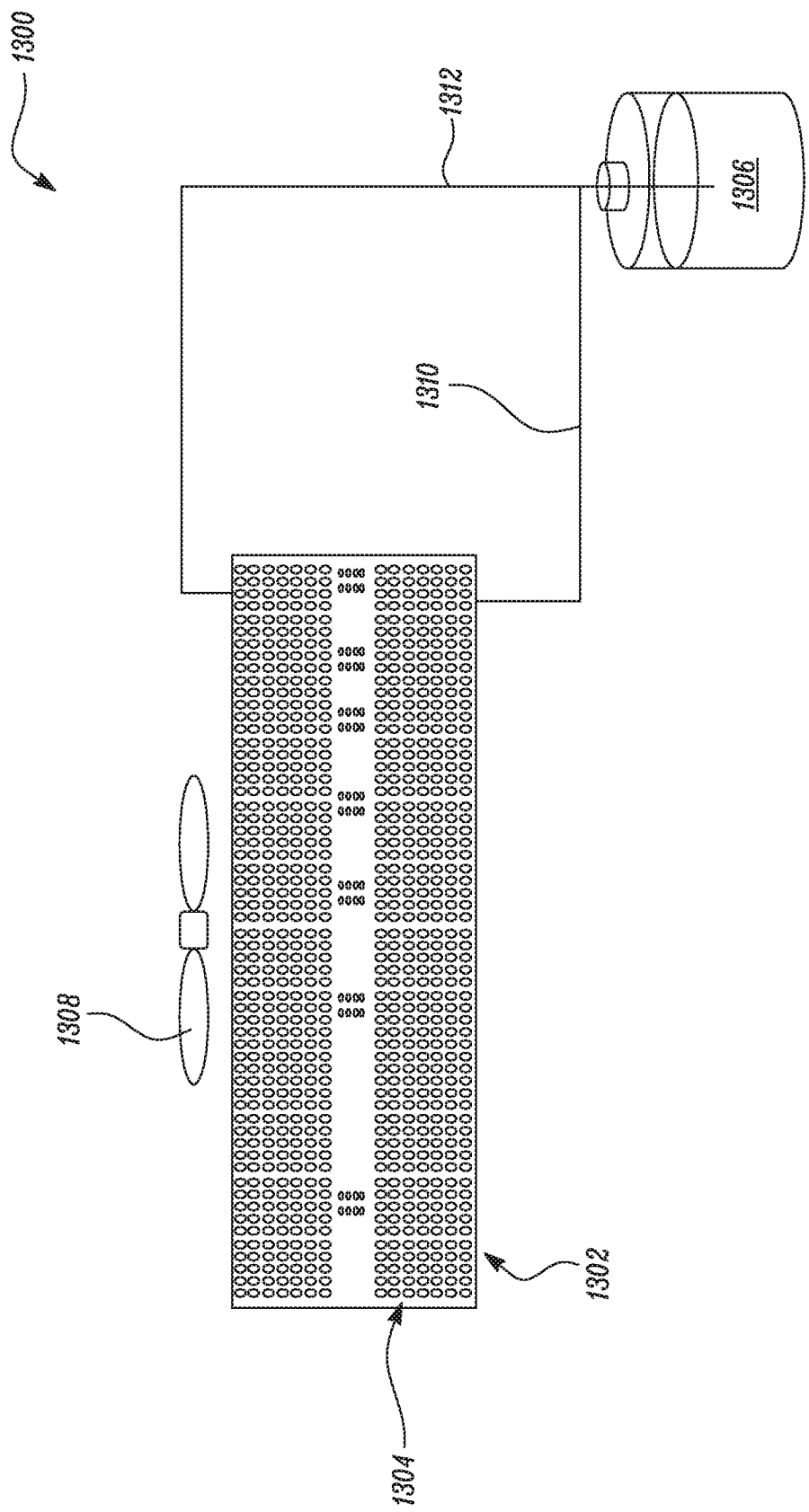
FIG. 13 illustrates a schematic representation of an exemplary test set-up having a contactor panel in accordance with some embodiments discussed herein.

Referring now to FIG. 13, an exemplary set-up 1300 that was used for conducting a series of experiments to compare performance of a contactor panel 1302 with conventional contactor panels including wetted cellulosic media is illustrated. The contactor panel 1302 is similar to the first contactor panel 112 associated with the first contactor system 100 of FIG. 1. The set-up 1300 illustrated herein was used to calculate a cooling effectiveness of the contactor panel 1302 having a membrane array 1304. As illustrated, a tank 1306 containing water was fluidly coupled with the membrane array 1304 using a first fluid conduit 1310 and a second fluid conduit 1312. The membrane array 1304 was a 60 layered membrane array. Moreover, a blower unit 1308 was disposed proximate the membrane array 1304 for pulling air through the membrane array 1304. Further, the set-up 1300 included a number of thermocouples for measuring an inlet temperature of inlet air and an outlet temperature of outlet air. The set-up 1300 also included humidity sensor to measure an inlet relative humidity and an outlet relative humidity of the inlet air and the outlet air.

Further, the inlet temperature, the inlet relative humidity, and an inlet specific enthalpy of the inlet air before contacting the membrane array 1304 was approximately equal to 23° Celsius (C), 5%, and 25 kilo Joules/kilograms (kJ/kg), respectively. An inlet temperature of the water entering hollow fibers of the membrane array 1304 was approximately equal to 15° C. Moreover, a pump (not shown) was disposed in the first fluid conduit 1310 to direct fluid through the hollow fibers. Further, cool, and humid air was released by the contactor panel 1302 based on contact between the water flowing through a lumen of each hollow fiber of the membrane array 1304 and the air flowing over an exterior surface of each hollow fiber of the membrane array 1304. The outlet temperature, an outlet relative humidity, and an outlet specific enthalpy of the outlet air was approximately equal to 16° C., 84%, and 40 kJ/kg, respectively. Further, a difference in the inlet specific enthalpy and the outlet specific enthalpy was approximately equal to 15 kJ/kg. Moreover, a saturation effectiveness and the cooling effectiveness of the contactor panel 1302 was calculated. From the calculations, it was concluded that the saturation effectiveness and the cooling effectiveness of the contactor panel 1302 was approximately equal to 0.48 and 44%, respectively. It should be noted that the term "saturation effectiveness" referred to herein is defined as a ratio of a difference between an inlet drub temperature and an outlet dry bulb temperature to a wet bulb depression. The inlet dry bulb temperature is the dry bulb temperature of the inlet air, the outlet dry bulb temperature is the dry bulb temperature of the outlet air. Moreover, the wet bulb depression is a difference between the inlet dry bulb temperature and a wet bulb temperature of the inlet air.

Further, a similar set-up was used to calculate a saturation effectiveness and a cooling effectiveness of a conventional contactor panel fitted with the wetted cellulosic media. An inlet temperature and an inlet relative humidity of inlet air before contacting the wetted cellulosic media was similar to the inlet temperature and the inlet relative humidity of the inlet air before contacting the membrane array 1304 of the contactor panel 1302. It was concluded from this experiment that the contactor panel 1302 with the membrane array 1304 exhibits improved saturation effectiveness and cooling effectiveness compared with the conventional contactor panel fitted with the wetted cellulosic media.

Figure 14:
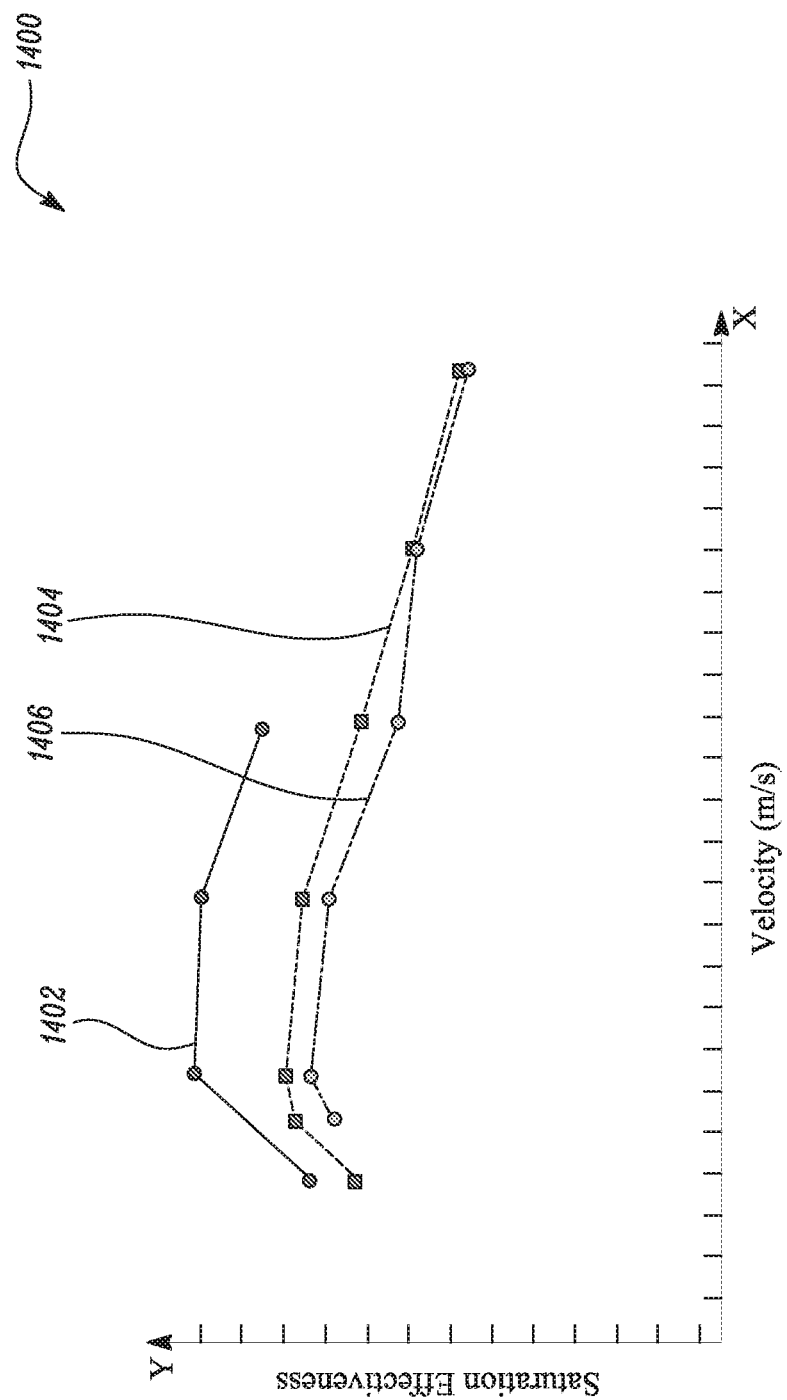
FIG. 14 illustrates a first exemplary plot in accordance with some embodiments discussed herein.

FIG. 14 illustrates an exemplary plot 1400. Various values for velocity (in meters per second) of inlet air are marked on X-axis and various values for saturation effectiveness are marked on Y-axis. Further, the plot 1400 illustrates a first curve 1402 that was plotted based on experiments on a contactor panel, similar to the contactor panel 112 associated with the first contactor system 100 of FIG. 1, with a 60 layered membrane array at high water flow rate. Moreover, a second curve 1404 was plotted based on experiments on a contactor panel, similar to the contactor panel 112 associated with the first contactor system 100 of FIG. 1, with a 20 layered membrane array at low water flow rate. Additionally, a third curve 1406 was plotted based on experiments on a contactor panel, similar to the contactor panel 112 associated with the first contactor system 100 of FIG. 1, with a 20 layered membrane array at high water flow rate. The saturation effectiveness exhibited by the contactor panels at different velocities were plotted to generate the curves 1402, 1404, 1406. From the plot 1400, it can be concluded that the contactor panel with the 60 layered membrane array exhibits improved saturation effectiveness as compared to the contactor panels with the 20 layered membrane array.

It should be noted that the contactor systems 100, 600, 700, 800, 900, 1200 described herein can be used in large scale applications, such as in datacenters. The contactor systems 100, 600, 700, 800, 900, 1200 may embody evaporative cooling systems for cooling the datacenters. Further, the contactor systems 100, 600, 700, 800, 900, 1200 may also be used in other outdoor evaporative cooling applications. The contactor systems 100, 600, 700, 800, 900, 1200 can be used in other applications for heating, cooling, humidifying, and/or dehumidifying, without limiting the scope of the present disclosure. The contactor panels 112, 156, 400, 500, 612, 712, 756, 818, 918 and the contactor panel arrangement 1208 may also exhibit improved cooling performance in a smaller footprint.

Further, the contactor systems 100, 600, 700, 800, 900, 1200 may allow usage of different types of membrane arrays 132, 170, 402, 632, 732, 770, 826, 926, 1210 such as a hollow fiber membrane (including a capillary membrane), a flat sheet membrane, a ceramic membrane, and the like, thereby increasing flexibility of the contactor systems 100, 600, 700, 800, 900, 1200. The membrane arrays 132, 170, 402, 632, 732, 770, 826, 926, 1210 may provide faster drying time as compared to conventional membranes and also allow independence of gravity for directing the first fluid. Moreover, the membrane arrays 132, 170, 402, 632, 732, 770, 826, 926, 1210 may also be used in adaptive contactor systems, such as the contactor systems 800, 900. Additionally, the membrane arrays 132, 170, 402, 632, 732, 770, 826, 926, 1210 may allow flexibility in placement of the contactor panels 112, 156, 400, 500, 612, 712, 756, 818, 918 and the contactor panel arrangement 1208 proximate to hot spots, in floors/walls/ceilings, or at different orientations based on design and space availability of an installation area.

When used in evaporative cooling systems, the contactor panels 112, 156, 400, 500, 612, 712, 756, 818, 918 and the contactor panel arrangement 1208 described in this disclosure may require a reduced quantity of water for operation thereof, due to high water vapor efficiency. Thus, the contactor panels 112, 156, 400, 500, 612, 712, 756, 818, 918 and the contactor panel arrangement 1208 may be used at locations where there may be a scarcity of water. Further, the contactor panels 112, 156, 400, 500, 612, 712, 756, 818, 918 and the contactor panel arrangement 1208 may exhibit reduced sensitivity to water quality. Moreover, the contactor panel 112, 156, 400, 500, 612, 712, 756, 818, 918 and the contactor panel arrangement 1208 may be interchangeably used for different applications, such as humidifying or dehumidifying. It should be noted that the contactor panels 112, 156, 400, 500, 612, 712, 756, 818, 918 and the contactor panel arrangement 1208 associated with the contactor system 100, 600, 700, 800, 900, 1200 described herein may be used in large scale applications, such as in data centers. For example, the contactor panel 112, 156, 400, 500, 612, 712, 756, 818, 918 and the contactor panel arrangement 1208 may be associated with the evaporative cooling system for cooling the data centers, other rooms installed with electronic devices, commercial applications, and the like. Further, the contactor panel 112, 156, 400, 500, 612, 712, 756, 818, 918 and the contactor panel arrangement 1208 may be used in various applications for heating, cooling, humidifying, and/or dehumidifying, without limiting the scope of the present disclosure. Moreover, the contactor panel 112, 156, 400, 500, 612, 712, 756, 818, 918 and the contactor panel arrangement 1208 may provide improved performance in a compact footprint. Further, the contactor panels 112, 156, 400, 500, 612, 712, 756, 818, 918 may allow both latent heat transfer and sensible heat transfer during operation. Accordingly, such contactor panels 112, 156, 400, 500, 612, 712, 756, 818, 918 operating at higher air flow velocities may demonstrate higher saturation effectiveness. This phenomenon may in turn allow designing of air handlers with a compact frontal area as compared to air handlers running with conventional media that may only allow latent heat transfer.

Further, the contactor panels 112, 156, 400, 500, 612, 712, 756, 818, 918 and the contactor panel arrangement 1208 may provide high structural integrity, which may in turn provide increased sustenance against higher liquid pressure without damaging a structure of the contactor panel 112, 156, 400, 500, 612, 712, 756, 818, 918 and the contactor panel arrangement 1208. It should be further noted that the contactor panels 112, 156, 400, 500, 612, 712, 756, 818, 918 and the contactor panel arrangement 1208 may be constructed based on customer's requirement, geographic areas, and climatic conditions at customer's location. Thus, the contactor panels 112, 156, 400, 500, 612, 712, 756, 818, 918 and the contactor panel arrangement 1208, and the various arrangements of the contactor panel 112, 156, 400, 500, 612, 712, 756, 818, 918 and the contactor panel arrangement 1208 may allow flexibility in installation and usage. Further, the contactor panel 112, 156, 400, 500, 612, 712, 756, 818, 918 and the contactor panel arrangement 1208 described herein may be retrofitted in existing contactor systems with minimum alterations to a design of the existing contactor systems.

Figure 15:
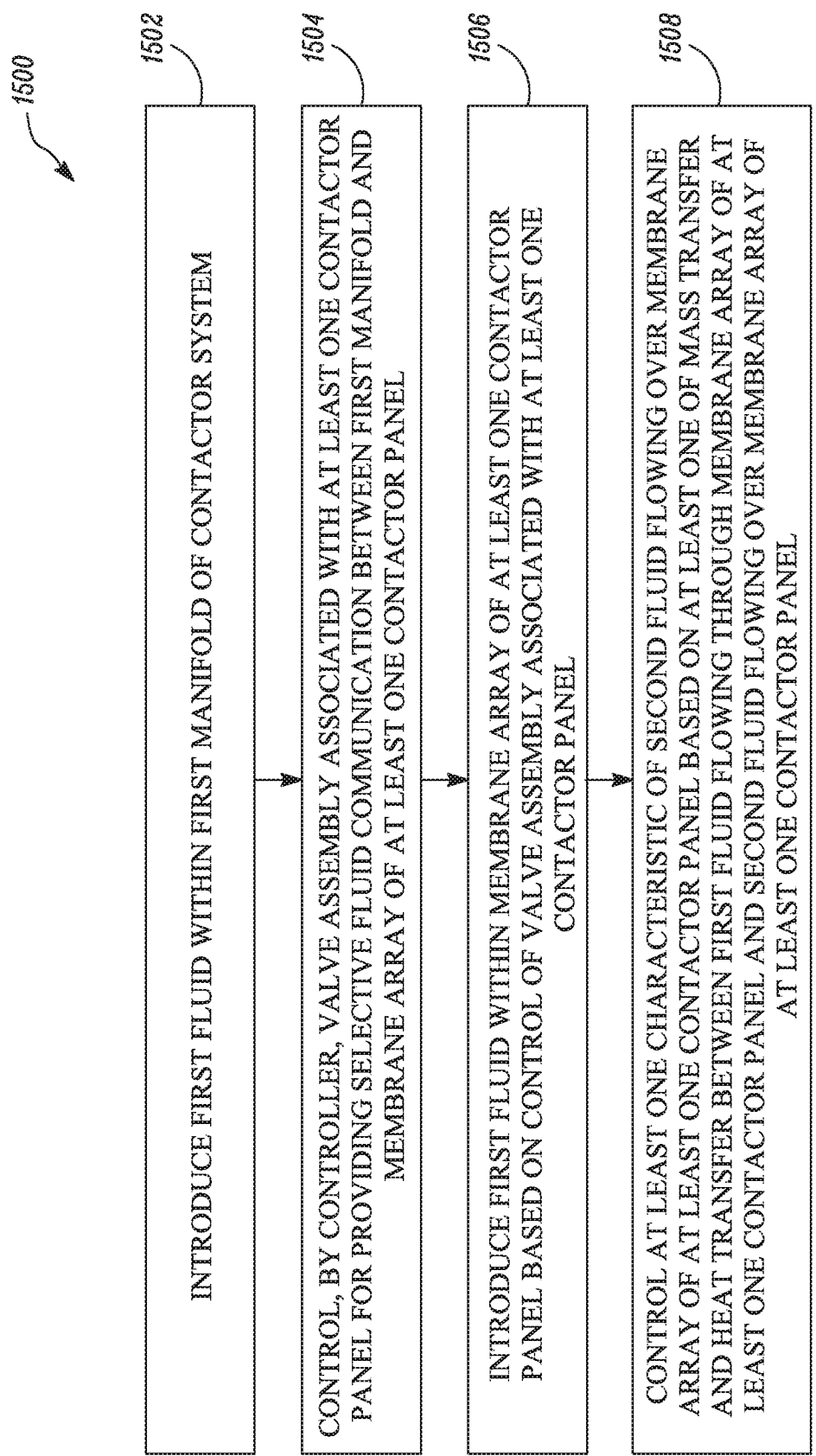
FIG. 15 is a flowchart for a method of controlling the contactor panel.

FIG. 15 illustrates a flowchart for a method of operating the contactor system 800. The method 1500 will be explained in relation to the contactor system 800 shown in FIG. 8. However, it should be noted that the method 1500 is equally applicable to other contactor systems 100, 600, 700, 900, 1200. At step 1502, the first fluid is introduced within the first manifold 810 of the contactor system 800. The first manifold 810 is in fluid communication with the tank 802 for directing the first fluid towards the first manifold 810. The contactor system 800 further includes the second manifold 816, the plurality of contactor panels 818, and the controller 840. Each contactor panel includes the membrane array 826 and the valve assembly 838. In an example, the contactor panel array 806 includes the plurality of contactor panels 818 disposed adjacent to each other. In another example, the plurality of contactor panel arrays 806 are spaced apart from each other. Further, in some examples, the plurality of contactor panels 818 are positioned in at least one of the ceiling 1112, the floor 1110, and the wall 1114 of the room 1104. In some examples, the plurality of contactor panels 818 are positioned in at least one of the evaporative cooling system, the dehumidification system, and a combination thereof.

At step 1504, the controller 840 controls the valve assembly 838 associated with at least one contactor panel 818 for providing selective fluid communication between the first manifold 810 and the membrane array 826 of the at least one contactor panel 818. At step 1506, the first fluid is introduced within the membrane array 826 of the at least one contactor panel 818 based on control of the valve assembly 838 associated with the at least one contactor panel 818. Further, the first fluid is introduced within the first portion 842 of the membrane array 826 including at least one of the plurality of hollow fibers 832, the flat sheet membrane, and a combination thereof. More particularly, the first fluid is introduced within the lumen 842 of each hollow fiber 832 of the plurality of hollow fibers 832 of the at least one contactor panel 818.

At step 1508, at least one characteristic of the second fluid flowing over the membrane array 826 of the at least one contactor panel 818 is controlled based on at least one of the mass transfer and the heat transfer between the first fluid flowing through the membrane array 826 of the at least one contactor panel 818 and the second fluid flowing over the membrane array 826 of the at least one contactor panel 818. The at least one characteristic of the second fluid includes the temperature and the humidity. The second fluid contacts with the second portion 844 of the membrane array 826. More particularly, the second fluid contacts with the exterior surface 844 of each hollow fiber 832 of the plurality of hollow fibers 832 of the at least one contactor panel 818. Further, the controller 840 controls the valve assembly 838 of the at least one contactor panel 818 based on at least one of the high thermal load location, the target temperature, the target humidity, and the temperature uniformity metric. More particularly, the controller 840 controls the valve assembly 838 to vary the flow rate of the first fluid flowing through the valve assembly 838 of the at least one contactor panel 818.

Further, the housing member 1002 is adapted to receive at least one contactor panel 818 of the plurality of contactor panels 818. The housing member 1002 defines the first longitudinal axis "L-L1". In an example, the at least one contactor panel 818 is received within the housing member 1002 such that the second longitudinal axis "B-B1" defined by the membrane array 826 of the at least one contactor panel 818 extends substantially perpendicular to the first longitudinal axis "L-L1" defined by the housing member 1002. In another example, the at least one contactor panel 818 is received within the housing member 1002 such that the second longitudinal axis "B-B1" defined by the membrane array 826 of the at least one contactor panel 818 extends substantially parallel to the first longitudinal axis "L-L1" defined by the housing member 1002.

Further, in some examples, at least one separator structure 404 (see FIG. 4) is positioned adjacent to the membrane array 402 (see FIG. 4). Moreover, at least two membrane arrays 402 may be positioned adjacent to each other. In some examples, the chilling module 640 (see FIG. 6A) is fluidly coupled with the tank 606 (see FIG. 6A). The chilling module 640 includes the coolant reservoir 646 (see FIG. 6A), the heat exchanger 642 (see FIG. 6A) in fluid communication with the coolant reservoir 646 and the tank 602, and the coolant pump 650 (see FIG. 6A) fluidly disposed between the tank 606 and the heat exchanger 642.

Various embodiments of the invention have been described. These and other embodiments are within the scope of the following claims.

What is claimed is:

1. A contactor system comprising:
   a plurality of contactor panels, each contactor panel including:
   a frame member; and
   a membrane array adapted to be received within the frame member, the membrane array defining a first end portion and a second end portion;
   a first manifold in selective fluid communication with the first end portion of the membrane array of each contactor panel, the first manifold being adapted to direct a first fluid towards the membrane array of each contactor panel;
   a second manifold in direct fluid communication with the second end portion of the membrane array of each contactor panel, the second manifold being adapted to receive the first fluid from the membrane array of each contactor panel;
   a controller configured to provide selective fluid communication between the first manifold and the first end portion of the membrane array of each contactor panel;
   a tank adapted to hold the first fluid therein;
   an inlet conduit adapted to provide fluid communication between the tank and the first manifold;
   an outlet conduit adapted to provide fluid communication between the tank and the second manifold; and
   a chilling module fluidly coupled with the tank, the chilling module including:
   a coolant reservoir;
   a heat exchanger in fluid communication with the coolant reservoir and the tank; and
   a coolant pump fluidly disposed between the tank and the heat exchanger.

2. The contactor system of claim 1, wherein each contactor panel further includes:
   a first conduit fluidly connecting the first manifold and the first end portion of the membrane array; and
   a second conduit fluidly connecting the second manifold and the second end portion of the membrane array.

3. The contactor system of claim 2, wherein each contactor panel further includes a valve assembly disposed in the first conduit and providing selective fluid communication between the first manifold and the first end portion of the membrane array.

4. The contactor system of claim 3, wherein the controller is communicably coupled with the valve assembly of each contactor panel, and wherein the controller is configured to selectively control the valve assembly of at least one contactor panel.

5. The contactor system of claim 4, wherein the controller is configured to selectively control the valve assembly of the at least one contactor panel based on at least one of a high thermal load location, a target temperature, a target humidity, and a temperature uniformity metric.

6. The contactor system of claim 4, wherein the controller is configured to control the valve assembly to vary a flow rate of the first fluid flowing through the valve assembly of the at least one contactor panel.

7. The contactor system of claim 1, wherein the frame member of each contactor panel defines a first headspace that provides fluid communication between the first manifold and the first end portion of the membrane array.

8. The contactor system of claim 1, further comprising a pump fluidly disposed between the inlet conduit and the tank.

9. The contactor system of claim 1, wherein the membrane array in each of the contactor panels includes at least one of a plurality of hollow fibers, a flat sheet membrane, and a combination thereof.

10. The contactor system of claim 9, wherein each hollow fiber includes a capillary membrane.

* * * * *